United States Patent [19]
Hewko

[11] Patent Number: 5,779,296
[45] Date of Patent: *Jul. 14, 1998

[54] PATIENT TRANSPORT SYSTEM

[75] Inventor: Barry J. Hewko, Sidney, Canada

[73] Assignee: Vancouver Island Helicopters, Ltd., British Columbia, Canada

[*] Notice: The term of this patent shall not extend beyond the expiration date of Pat. No. 5,490,703.

[21] Appl. No.: 743,860

[22] Filed: Nov. 5, 1996

Related U.S. Application Data

[63] Continuation-in-part of Ser. No. 479,083, Jun. 7, 1995, abandoned, which is a continuation-in-part of Ser. No. 72,569, Jun. 4, 1993, Pat. No. 5,490,703.

[51] Int. Cl.$^6$ .................. A61G 3/00; B64C 1/22
[52] U.S. Cl. .............. 296/19; 244/118.6; 244/137.2
[58] Field of Search .............. 296/19, 20; 5/118; 244/118.1, 118.5, 118.6, 137.1, 137.2; 414/402, 584

[56] References Cited

U.S. PATENT DOCUMENTS

| | | | |
|---|---|---|---|
| 2,085,043 | 6/1937 | Richter | 414/522 |
| 2,186,848 | 1/1940 | Uhlir | 280/408 |
| 2,196,265 | 4/1940 | Krogh | 414/522 |
| 2,229,483 | 1/1941 | Toulmin, Jr. | 414/522 |
| 2,573,496 | 10/1951 | Runkle | 414/522 |
| 3,204,998 | 9/1965 | Stollenwerk | 296/19 |
| 4,071,210 | 1/1978 | Mutke | 244/118.6 |
| 4,078,269 | 3/1978 | Weipert | 5/611 |
| 4,093,303 | 6/1978 | Nelson | 296/65.1 |
| 4,097,941 | 7/1978 | Merkel | 295/20 |
| 4,115,884 | 9/1978 | Keogh | 5/625 |
| 4,178,032 | 12/1979 | Hone | 296/19 |
| 4,301,984 | 11/1981 | Olason | 244/137.1 |
| 4,378,128 | 3/1983 | Holling et al. | 296/19 |
| 4,457,663 | 7/1984 | Hems et al. | 414/522 |
| 4,485,504 | 12/1984 | Lehmann | 5/628 |
| 4,488,326 | 12/1984 | Cherry | 14/72.5 |
| 4,526,346 | 7/1985 | Galloway et al. | 254/122 |
| 4,549,720 | 10/1985 | Bergenwall | 254/124 |
| 4,555,211 | 11/1985 | Metz | 414/401 |
| 4,558,648 | 12/1985 | Franklin et al. | 108/147 |
| 4,577,821 | 3/1986 | Edmo | 108/145 |
| 4,637,575 | 1/1987 | Yenzer | 244/118.5 |
| 4,655,466 | 4/1987 | Hanaoka | 280/47.371 |
| 4,712,653 | 12/1987 | Franklin et al. | 187/269 |
| 4,783,025 | 11/1988 | Moffett | 244/118.5 |
| 4,783,109 | 11/1988 | Bucalo | 296/20 |
| 4,805,954 | 2/1989 | Lazaroff | 296/65.1 |
| 4,824,158 | 4/1989 | Peters et al. | 296/37.6 |
| 4,890,692 | 1/1990 | Oakman | 182/141 |
| 4,923,357 | 5/1990 | Isogai | 414/495 |
| 4,957,121 | 9/1990 | Icenogle et al. | 128/897 |
| 4,979,592 | 12/1990 | Isogai | 187/243 |
| 4,984,774 | 1/1991 | Zupancic et al. | 5/601 |
| 5,054,578 | 10/1991 | Smillie, III et al. | 182/69.4 |
| 5,092,722 | 3/1992 | Reazer, III et al. | 410/104 |
| 5,105,915 | 4/1992 | Gary | 187/200 |
| 5,135,350 | 8/1992 | Eelman et al. | 414/786 |
| 5,490,703 | 2/1996 | Hewko | 296/19 |

*Primary Examiner*—Andrew C. Pike
*Attorney, Agent, or Firm*—Zackery Legal Group

[57] ABSTRACT

An apparatus secures at least two patient supports within a vehicle during transport, particularly adaptable within helicopters. Patient supports are secured to trays that are removably, telescopically connected to bases on a floor of a vehicle. The trays are telescopically, longitudinally, extended relative to the bases. Also, the trays are pivotally attached to a base for pivotal movement about an axis perpendicular to the floor, which includes an electric jack for moving the trays towards and away from the floor.

14 Claims, 27 Drawing Sheets

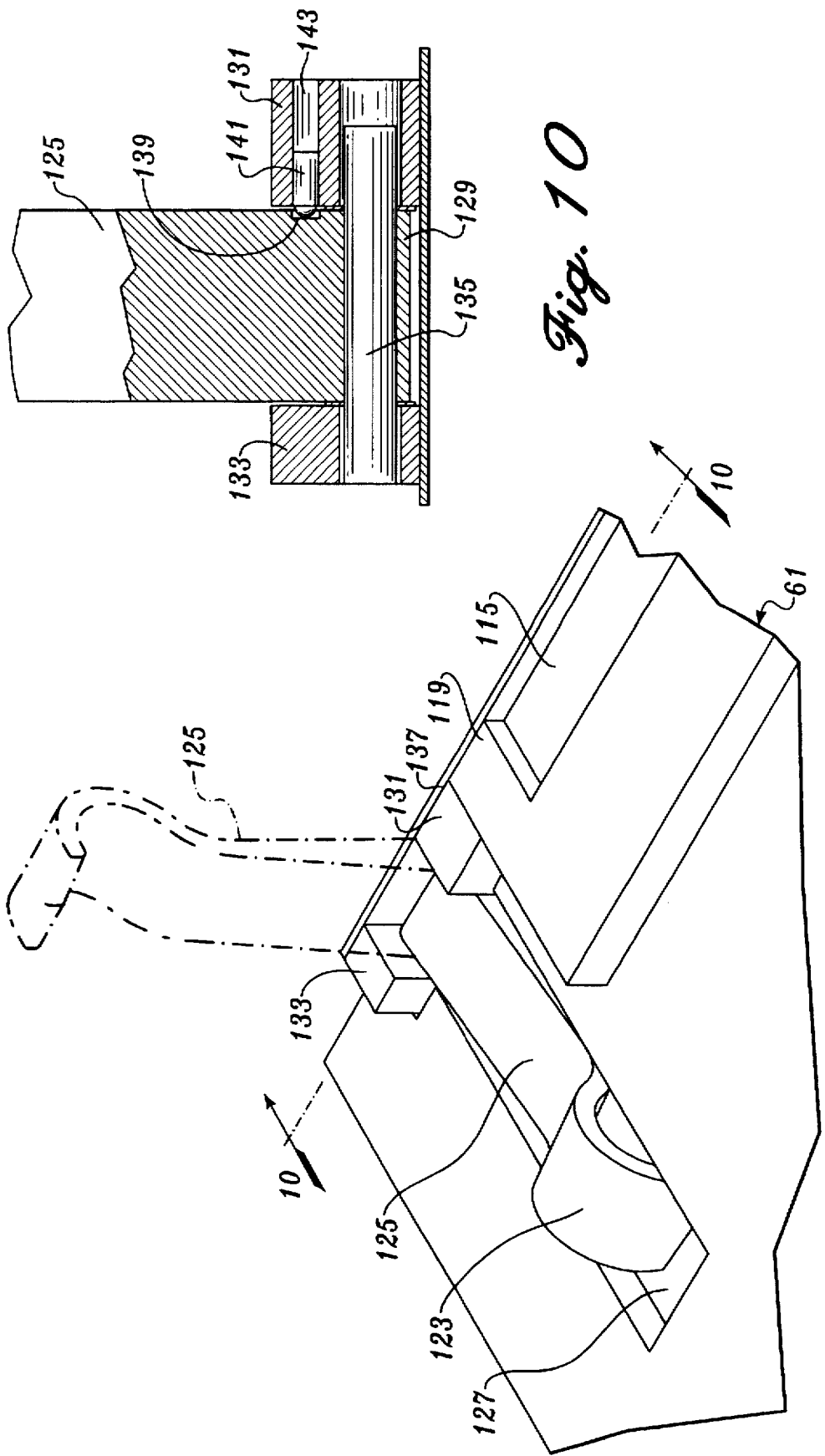

5,779,296

PATIENT TRANSPORT SYSTEM

RELATED APPLICATIONS

This is a continuation-in-part of prior U.S. application Ser. No. 08/479,083, filed Jun. 7, 1995, now abandoned, which was a continuation-in-part of U.S. application Ser. No. 08/072,569, filed Jun. 4, 1993, issued Feb. 13, 1996 as U.S. Pat. No. 5,490,703, the benefit of the filing dates of these previous applications of which are hereby claimed under 35 U.S.C. § 120, and the contents of which U.S. patent is incorporated herein by reference.

FIELD OF THE INVENTION

The present invention generally relates to transferring and transporting patients in emergency medical vehicles, and more specifically relates to helicopters having interiors designed for quick, convenient, and safe transfer and transport of a plurality of patients and medical attendants.

BACKGROUND OF THE INVENTION

Aircraft, specifically helicopters, are commonly used to transport seriously injured patients to health care facilities. In order to use aircraft for medical purposes, the aircraft interior must be capable of accommodating the equipment and supplies necessary for proper care during transportation, in addition to one or more medical attendants who should have convenient access to the equipment, supplies, and, most importantly, the patient.

Aircraft adaptable to medical missions can generally accommodate the weight of at least three passengers and up to as many as 32 passengers depending on the size of the aircraft. However, when one or more of the passengers is being transported in a prone position (as is generally necessary for medical purposes) the arrangement of the cabin interior affects the efficiency of treating the patient and the ability to accommodate a maximum patient load. If the interior is not properly configured, an aircraft readily capable of transporting two or more patients may be limited to a single patient. Hence, additional trips must be made with the aircraft, thereby increasing the expense in transporting two or more patients to a medical facility. Ultimately, the weight-carrying performance capability of the aircraft remains an unused resource. In addition, while the interior of some aircraft may be designed for two or more patients, inefficiencies in design of the interior can result in attendants preferring that only one patient be transported at a time due to inaccessibility to the patients when two or more patients are transported together, or wherein the equipment necessary to carry the second patient is so cumbersome to use that the attendants remove it from the aircraft, making it unavailable when needed. The culmination of inefficient medical vehicle interiors is a financial waste and a heavy burden on the medical facility sponsoring the vehicle, which is ultimately passed on to the patient and/or the patient's financial provider.

No efficient method or apparatus is known for supporting a number of pieces of portable medical equipment in such a way that they are close to the patient, transportable with the patient and stretcher, and yet easily removed as a unit.

In ambulances and other emergency/rescue vehicles such as helicopters, removable stretchers or patient litters are often provided for convenient and comfortable patient transfer and transportation. The litters for emergency medical aircraft use are somewhat standard, most using a Ferno #9 litter or the like. Such litters include a structural tubular frame to provide lightweight support for the patient. The litter includes wheels to support its head end and legs to support its foot end. Once the patient is carried or rolled on the litter to the helicopter, the litter is placed within the helicopter and fastened into position for safe transportation.

When a stretcher or litter is placed within an emergency medical vehicle, it must be secured in place to prevent upset or injury not only to any patient who may be lying on the stretcher, but also to others nearby. However, for efficiency and safety, several other considerations exist beyond simply positively securing the litter within the vehicle. Any stretcher securing or locking system must be easy to use since time is often a critical factor and delays can be costly. The system should also be constructed to secure standard litters. Another consideration is space. The locking system should be small with a flat cross section, especially when not in use, to avoid catching on persons, objects, or portions of the litter. The locking system must also be clear of other tables or trays that may be used above or below the locking system.

Frequently, more than one patient must be transported simultaneously. To be able to use the same vehicle, more than one station or table on which to secure stretchers or litters must be provided so that two or more can be safely and conveniently secured within one vehicle. However, space may be quite limited such that extra tables may be awkward to keep on board or hazardous in an emergency landing if the second litter is inadvertently left unsecured. Since an extra table must be kept clear while loading the first patient on the first litter or when loading only one patient and since adequate space may not exist to fold up and store an extra table when not in use, it may become cumbersome for the medical attendants to continually reposition the second litter. The attendants may choose not to use the second litter thus reducing the aircraft to a single patient aircraft. Therefore, a need exists for an apparatus including at least two litter tables or supports to secure litters while not interfering one with another.

Considering the limitations and disadvantages of the devices and methods currently in use, it should be apparent that effective solutions to the problems of transferring and transporting patients in an emergency medical vehicle, such as a helicopter, including necessary equipment and supplies, and releasably securing a stretcher or litter within the vehicle are not provided in the known prior art.

SUMMARY OF THE INVENTION

The present invention provides a system for transferring patients to and from emergency medical vehicles and for securing the patients within the vehicles during transport. In the preferred embodiment, the system is adapted for aircraft, particularly helicopters, with at least two patient supports or stations within the helicopter for securing two patients therein. The system accommodates standard stretchers or patient litters, so that a patient need not be transferred from one type of cot or table to another, but can remain on the standard litter during the transfer and transport procedure.

More specifically, in a preferred embodiment the aircraft interior is configured to have a first patient station in the rear of the aircraft approximately aligned with but above and behind a second patient station. The patients are loaded head forward such that the heads and chests of both patients are exposed for convenient access by an attendant or attendants. The patients are positioned toward one side of the aircraft, leaving room for attendants at the other.

In order to load the patients into the separate stations, interlockable trays and support plates are used. An upper tray is initially telescoped within a lower tray and can be swung to an oblique position pointed toward the exterior door of a helicopter. The upper tray is adapted to receive the standard stretcher or patient litter thereon, and includes mechanism for locking the litter in position on the tray. Thereafter, the upper tray can be retracted into the lower tray, whereupon the assembly of telescoped trays can be swung inward to a position extending longitudinally of the aircraft. A lift assembly raises the interfitted trays such that the upper tray can be slid rearward into a bedplate assembly located in the aft portion of the aircraft cabin. The upper tray is separable from the lower tray after insertion into the bedplate. The lower tray is lowered by the lift assembly, and then is swung to the oblique position to receive a second patient litter through the exterior door. Finally, the second tray with the second patient litter secured thereon is swung to a longitudinally extending position along one side of the aircraft cabin.

Preferably each tray has shallow grooves or tracks for the supporting posts and rollers of the standard stretcher or patient litter. At one end of the tray upright retainers are positioned to hook over the litter frame, whereas at the other end of the tray an axle locking assembly is provided including hooks for fitting over the axle of the litter. Identical locks are provided for both trays.

Preferably the lower tray is mounted directly on a carriage and lift assembly. A releasable locking mechanism is provided to secure the lower tray in position extending longitudinally of the aircraft. When released, such locking mechanism permits the lower tray (and the upper tray if still supported thereon) to be swung toward the door opening at one side of the aircraft. The lift assembly also can be moved transversely of the aircraft, with locking mechanism being provided for securing the lift assembly in a desired transversely shifted position.

In other aspects, the invention provides an apparatus for positioning and securing a patient support relative to an interior of a vehicle having a floor. The apparatus includes a first tray for removably receiving the patient support wherein the patient support can be secured to the first tray for transportation of a patient. The apparatus additionally includes a first base on the floor of the vehicle, with the first tray being removably, telescopically connected to the first base such that the first tray can be telescopically, longitudinally extended relative to the first base. Further, the first tray is pivotally attached to the first base for pivotal movement of the first tray about an axis generally perpendicular or orthogonal to the floor. Also, the first base includes a mechanism for moving the first tray towards, and away from, the floor. Preferably, the first base is movably secured to the floor of the vehicle.

In further features of this apparatus, the first base includes a second tray in which the first tray detachably mounts such that the first tray and the second tray are removably, telescopically connected, allowing the first tray to be telescopically, longitudinally extended relative to the second tray. In this regard, the second tray is pivotally connected to the base to provide for the pivotal movement of the first tray and the second tray.

In yet other aspects, the invention provides an apparatus for positioning and securing a first patient support and a second patient support relative to an interior of a vehicle having a floor. The apparatus includes a first tray for removably receiving the first patient support. The apparatus additionally includes a second tray for removably receiving the second patient support. Further, the first tray and the second tray are removably telescopically connected such that the first tray can be oriented on the second tray and can be telescopically, longitudinally extended relative to the second tray. This apparatus also includes a first base on the floor of the vehicle adapted to support the second tray. In this regard, the second tray is pivotally attached to the first base for pivotal movement of the first tray and the second tray about an axis generally perpendicular or orthogonal to the floor. Moreover, the first base includes an electric jack mechanism for moving the first tray and the second tray towards, and away from, the floor. Preferably, this apparatus has the first base movably secured to the floor of the vehicle.

In further details of this apparatus, the first tray is removable from the second tray and is securable in the vehicle at a location remote from the second tray upon telescopic, longitudinal extension of the first tray relative to the second tray. This feature permits sequential loading of the first patient support onto the first tray followed by loading of the second patient support onto the second tray.

In additional details of this apparatus, the first base and the second base each have a longitudinal axis, with the longitudinal axes of the first base and the second base being substantially parallel. Preferably, the longitudinal axes of the first base and the second base are also substantially coaxial when the electric jack mechanism has moved the first base a predetermined distance relative to the floor such that the first tray can be transferred from the first base to the second base.

BRIEF DESCRIPTION OF THE DRAWINGS

The advantages of the present invention will become more readily appreciated as the same become better understood by reference to the following detailed description, when taken in conjunction with the accompanying drawings, wherein:

FIG. 9 is an enlarged detail perspective of a component of the litter securing mechanism of FIG. 8, with parts broken away;

FIG. 10 is a further enlarged detail side elevation section of the litter retaining component of FIG. 9, with the section taken along line 10—10 of FIG. 9;

DETAILED DESCRIPTION OF THE PREFERRED EMBODIMENT

For purposes of describing the details of the preferred embodiment of the present invention, the preferred embodiment will be limited to an aircraft interior, specifically components of an interior for helicopters used for the transportation of injured patients. This includes both on-scene work, where the aircraft picks up the patient directly from the scene of an accident, and the transportation of patients from one location to another, such as from one medical center to a different medical center.

The preferred aircraft interior configuration in accordance with the present invention is designed to accommodate one, two, or more patients on stretchers or litters with a minimum of one pilot and one medical attendant. It is the intent of the present invention to provide an interior which readily accommodates the transportation of two or more patients while functioning equally as well with one patient.

The interior configuration described herein can be adjusted for different aircraft depending on accessibility to the aircraft interior through exterior doors, and the arrangement of the aircraft cabin. The patients could be located on the right side of the cabin, in which case the medical attendants would be located on the left side of the aircraft cabin, or vice versa. Also, the patients may be located substantially in the center of the aircraft with the attendants on either the right side or the left side of the aircraft or both.

For purposes of further describing the present invention, the patients are loaded through the right side of the aircraft 21 and are positioned adjacent to the left side of the aircraft 21; the medical attendants are positioned toward the right side of the aircraft 21. This configuration corresponds to the layout of the cabin and exterior doors of a Bell 222/230/430 helicopter. In this regard, the preferred positioning of the patients will be on the left side of the aircraft 21, the first patient being positioned substantially above, to the rear, and to the right of the second patient. The patients are loaded feet toward the rear of the aircraft so that the medical attendants have unrestricted access to the head and body torsos of each patient. The medical attendants of the present invention are located on the right side of the aircraft 21 and can move substantially from the forward bulkhead represented by the horizontal plane to the rear cabin bulkhead represented by the vertical plane.

Figure 1:
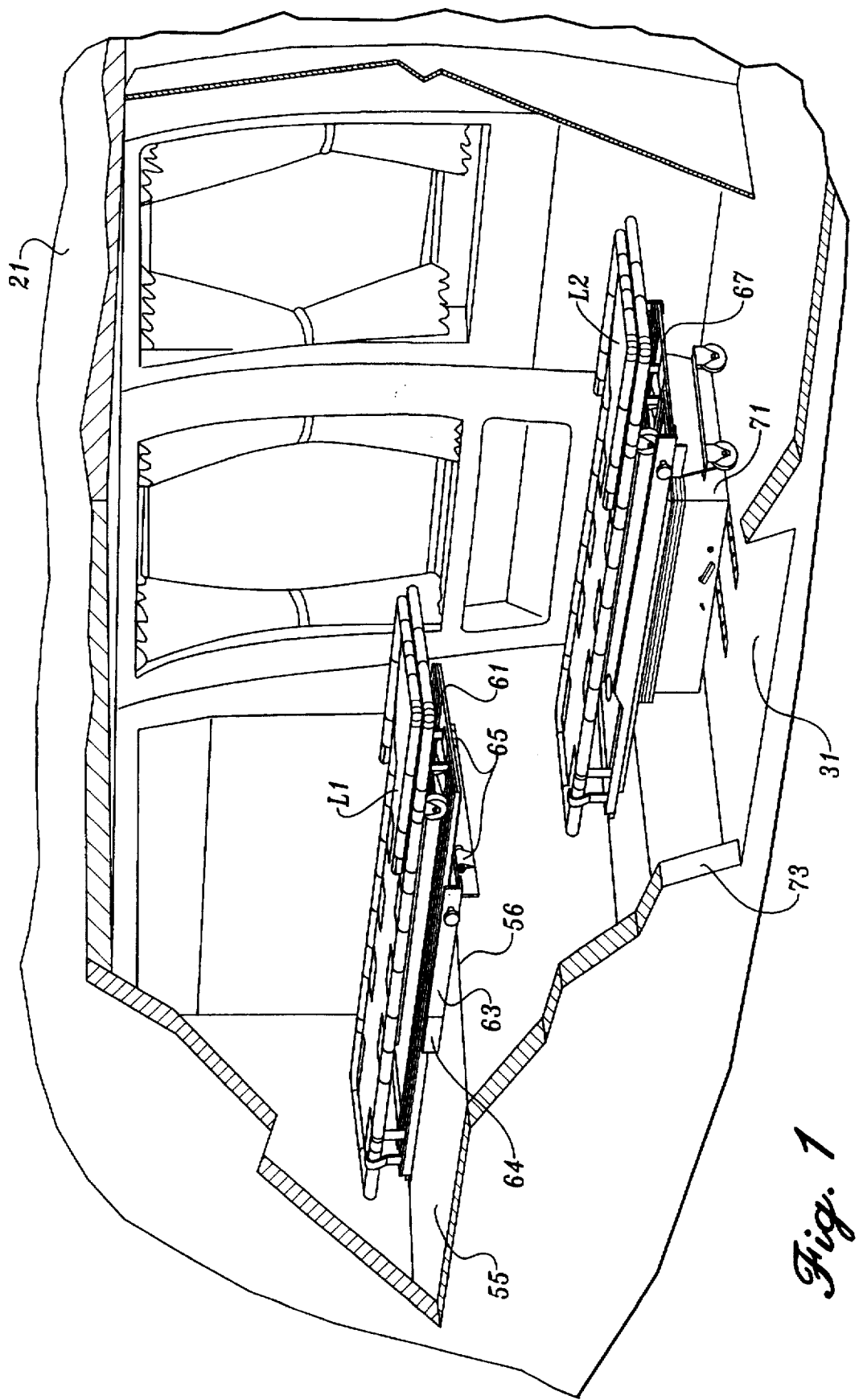
FIG. 1 is an enlarged top right perspective of the cabin of an aircraft with parts broken away.

FIG. 1 illustrates the preferred positioning of two patient stretchers or litters as they would appear in a helicopter 21 having its cabin modified in accordance with the present invention. A first stretcher or littler L1 is supported on the rear deck 55 which is positioned substantially above the aircraft floor 31 and higher than the second stretcher or littler L2. The litter L1 is offset toward the left of the aircraft for access by a medical attendant riding on the right, but not so far to the left as the lower litter L2. The rearwardmost position places the foot of stretcher or litter L1 close to the rear bulkhead 57 of the aircraft cabin. The head of the other litter L2 is positioned substantially forward of the head of litter L1, but still substantially to the rear of the pilot seat or seats. The litter L2 is supported above the aircraft floor 31 for convenient access by the medical attendant or attendants and to allow positioning of a carriage and lifting assembly 71 between the second litter L2 and the aircraft floor 31.

With continued reference to FIG. 1, the upper stretcher or litter L1 is supported on an upper tray 61 which, in turn, is detachably mounted in a bedplate assembly 63, 64. The tray 61 includes a mechanism for locking the litter L1 in position on the tray 61. Similarly, bedplate assembly 63, 64 includes a mechanism for locking the tray in such assembly (described in greater detail below). In addition, the front portion or front plate 63 of the bedplate assembly is pivotally mounted on the upper rear deck portion 55 by hinges 65 for swinging about a horizontal axis extending transversely of the aircraft 21. Such axis is approximately aligned with the corner 56 at the leading edge of the rear deck portion 55. The rear portion or rear plate 64 is a channel iron permanently secured to the rear deck portion 55.

The lower litter L2 is supported on and locked to a lower tray 67. The lower tray 67 is supported on the carriage and lift assembly 71. The carriage and lift assembly 71 allows the vertical position of the lower tray 67 and the litter L2 to be adjusted, even when carrying a patient. That is, the carriage and lift assembly 71 moves the lower tray 67 and the litter L2 towards, and away from, the floor. The carriage and lift assembly 71 also is movable transversely of the aircraft 21. Additionally, the lower tray is swingable relative to the carriage and lift assembly 71 about a vertical axis located toward the foot end of the lower tray 67 and the litter L2. For example, FIG. 1 illustrates the lowered and leftmost shifted position of the carriage and lift assembly 71, as well as the longitudinally extending position of the lower tray 67. From such longitudinally extending position, the head end portion of the lower tray 67 can be swung to the right, toward the exterior door opening 73 of the aircraft 21. Thus, the tray 67 is pivotally attached to the carriage and lift assembly 71 for pivotal movement of the tray about an axis generally vertical (i.e., perpendicular or orthogonal) to the floor of the vehicle.

The final positioning of the patient litters L1 and L2 illustrated in FIG. 1 provides convenient access to the patients by a medical attendant and/or attendants. In addition, the interconnection of the litter supporting trays 61 and 67 with the upper bedplate assembly 63, 64 and the carriage and lift assembly 71 permits quick, convenient and safe loading of a plurality of patients into the aircraft 21.

The sequence of loading two patients is illustrated diagrammatically in FIGS. 2–7, in which some parts are deleted and, in general, parts are shown diagrammatically for ease in understanding the patient loading procedure. Also, in several views the patients and the litters on which they are supported are not illustrated so that the underlying components in accordance with the present invention can be seen.

Figure 2:
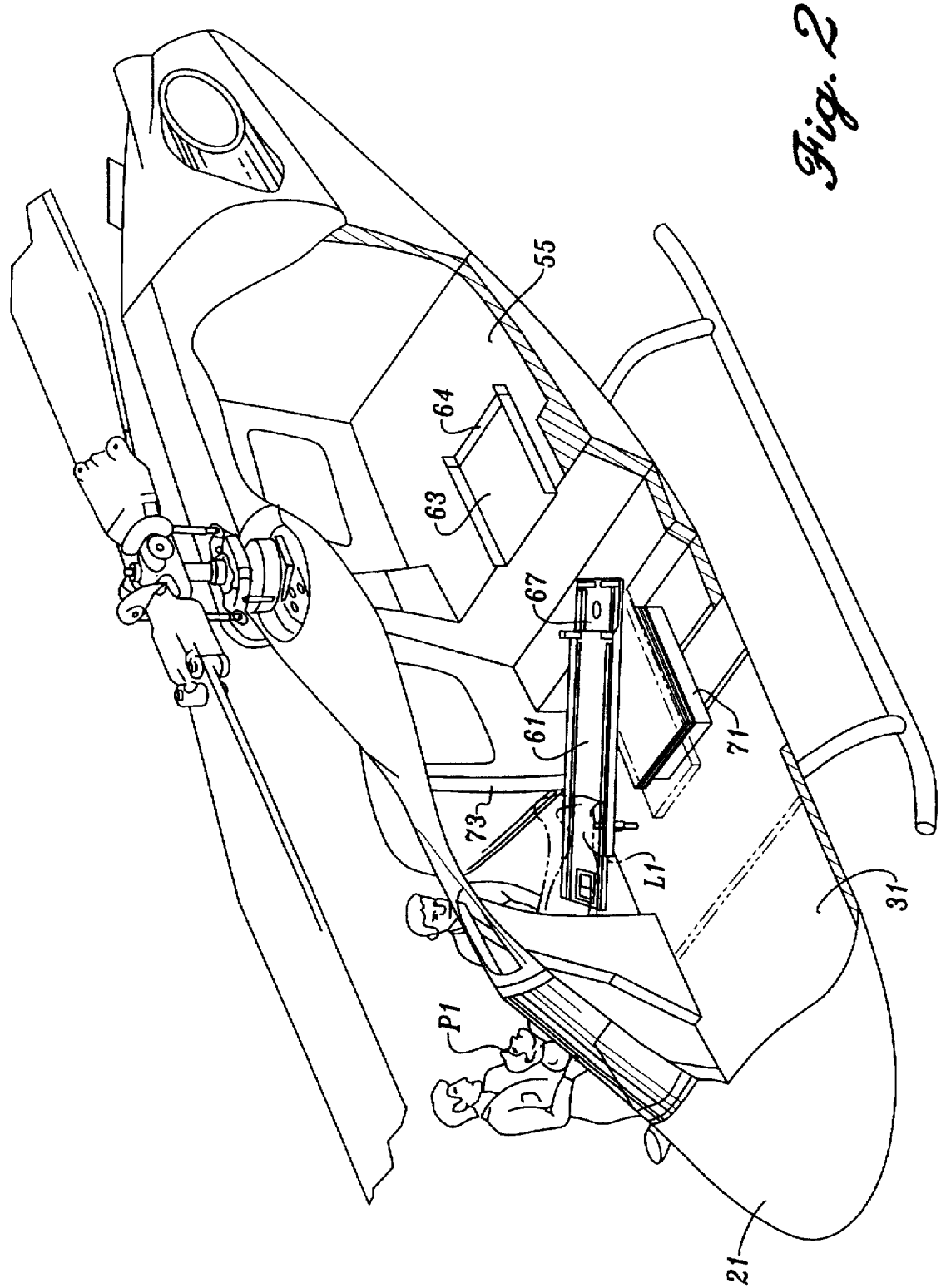
FIG. 2 is a diagrammatic top left perspective of an aircraft with parts broken away and parts in different positions, illustrating the beginning of the procedure of loading a patient in the transport system of the present invention.

With reference to FIG. 2, initially the upper tray 61 is fitted within the lower tray 67, and the upper bedplate assembly 63, 64 is empty. There is a limited sliding fit of the upper tray 61 into the lower tray 67 such that, with the carriage and lift assembly 71 shifted toward the center of the aircraft 21 and with the lower tray 67 pivoted outward toward the exterior door opening 73, the upper tray 67 can be telescoped outward, preferably part way through the exterior door opening 73. It is not necessary to shift the carriage and lift assembly 71 toward the center of the aircraft 21, however, this feature enhances loading and unloading patients. The first patient P1 supported on the standard stretcher or patient litter L1 (such as a Ferno #9 litter) is loaded onto the upper tray 67. The litter L1 is slid rearward onto the upper tray 61, foot end first, until the litter L1 is fully supported on the upper tray 61. Then the litter L1 is locked in position (the locking mechanism being described in detail below).

Figure 3:
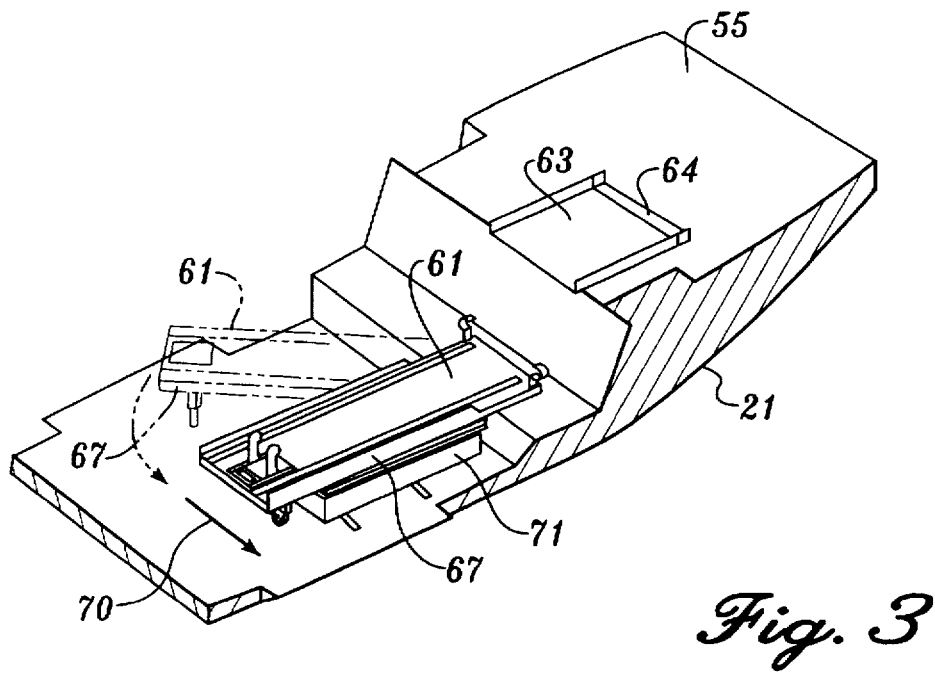
FIG. 3 is a top left perspective illustrating diagrammatically a first additional step in the procedure of loading a patient in the patient transport system of the present invention.
Figure 4:
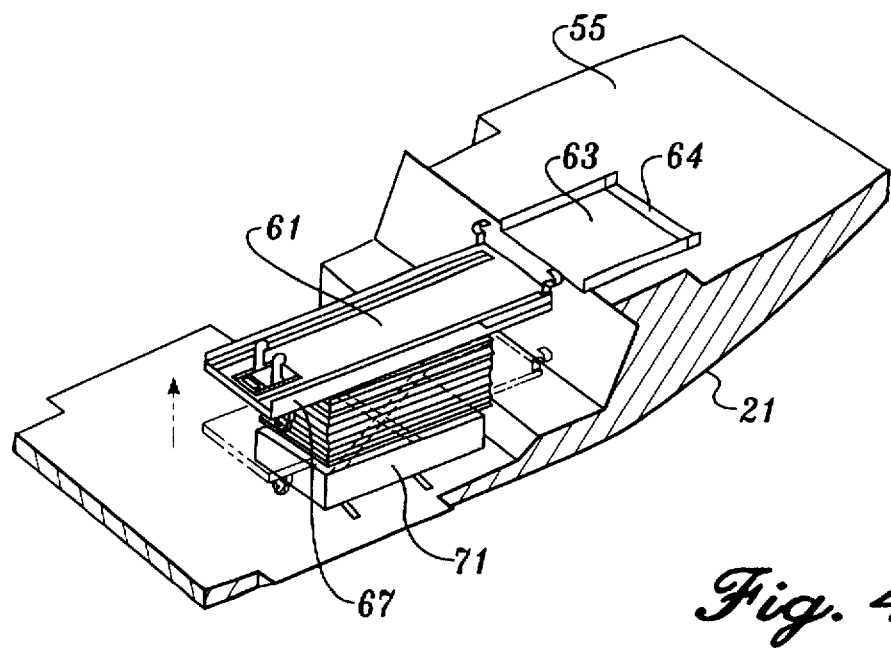
FIG. 4 is a top left perspective illustrating diagrammatically a second additional step in the procedure of loading a patient in the patient transport system of the present invention.

With reference to FIG. 3, the next step is to telescope the upper tray 61 back along the lower tray 67 so that the two trays are substantially registered in the position shown in broken lines in FIG. 3. From such a position the lower tray 67 can be swung inward, back over the carriage and lift assembly 71 to the solid line position shown in FIG. 3. The telescoping action of the upper tray 61 over the lower tray 67 provides more convenient access for loading the patient through the exterior door opening 73, while permitting the lower tray 67 to remain in the retracted position so that once the upper tray 61 is locked into the retracted position on the lower tray 67, both trays 61 and 67 can be swung past the frame of the exterior door opening 73, inward to the solid line, longitudinally extending position. The carriage and lift assembly 71 and the trays 61 and 67, and the patient litter L1 supported thereby are shifted to the left of the aircraft 21, as indicated by the arrow 70, which can be done either before or after swinging the lower tray 67 to the longitudinally extending position.

Figure 5:
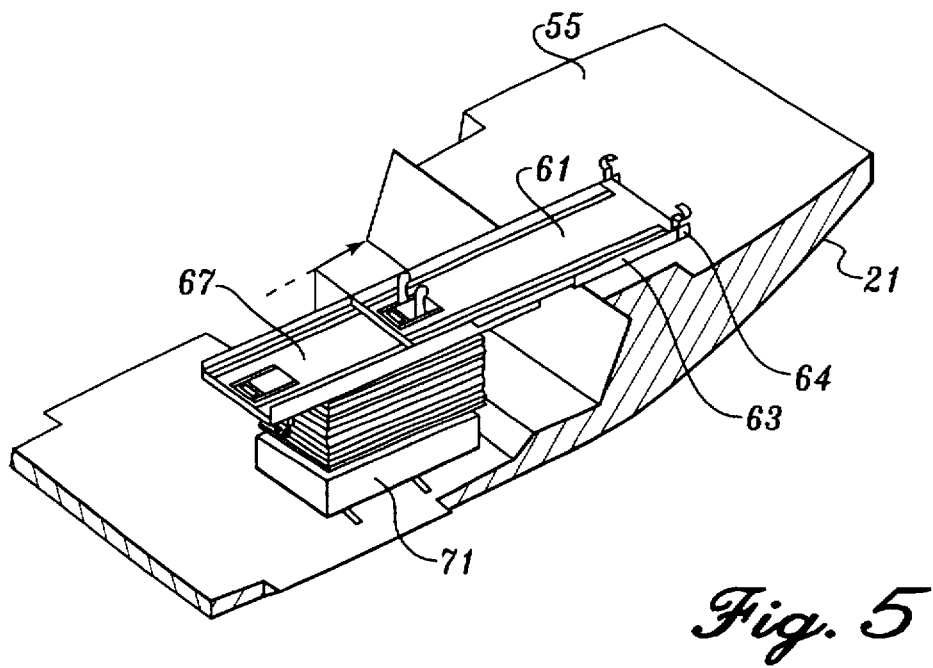
FIG. 5 is a top left perspective illustrating diagrammatically a third additional step in the procedure of loading a patient in the patient transport system of the present invention.

If only a single patient is to be transported, no additional steps are required to load and secure the patient in the aircraft 21. However, if a plurality of patients are to be transported, the carriage and lift assembly 71 is actuated to raise the lower tray 67, as well as the upper tray 61 and the patient litter L1 (and patient) supported thereby, to the position illustrated in FIG. 4. In the raised position of the carriage and lift assembly 71 illustrated in FIG. 4 and FIG. 5, the upper tray 61 is at approximately the same height as the bedplate assembly 63, 64 supported on the rear deck portion 55 of the aircraft 21. The upper tray 61 is released from the lower tray 67 such that it may be slid rearward into the bedplate assembly 63, 64 as illustrated in FIG. 5. In the rearwardmost shifted position of the upper tray 61, its foot end projects beyond the rear plate 64, and a short section of the head end portion of the upper tray 61 projects forward from the front plate 63 so as to overhang from the rear deck portion 55. The rearwardmost shifted position of the upper tray 61 is illustrated in solid lines in FIG. 6.

Figure 6:
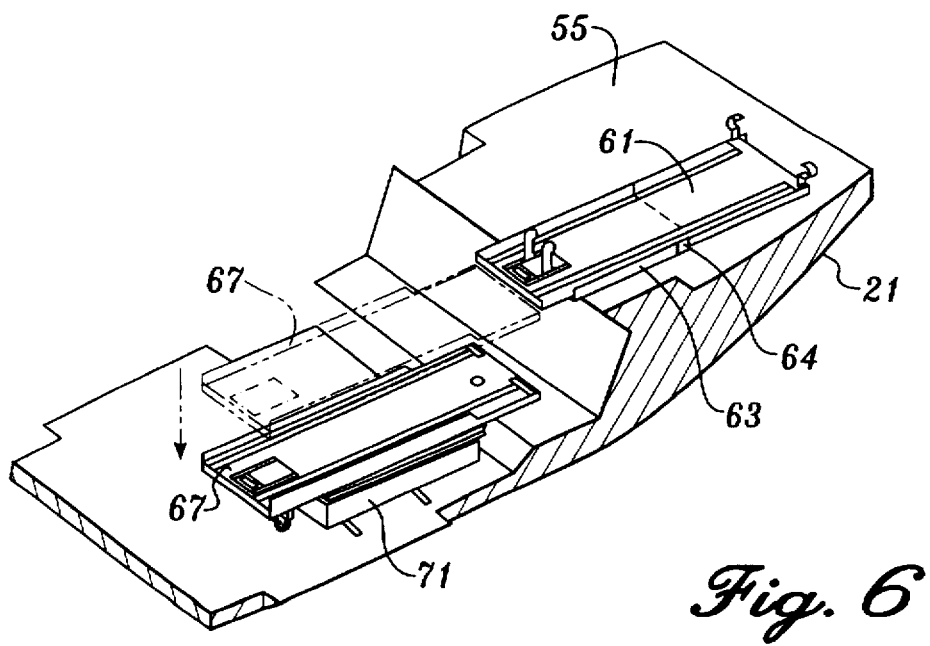
FIG. 6 is a top left perspective illustrating diagrammatically a fourth additional step in the procedure of loading a patient in the patient transport system of the present invention.
Figure 7:
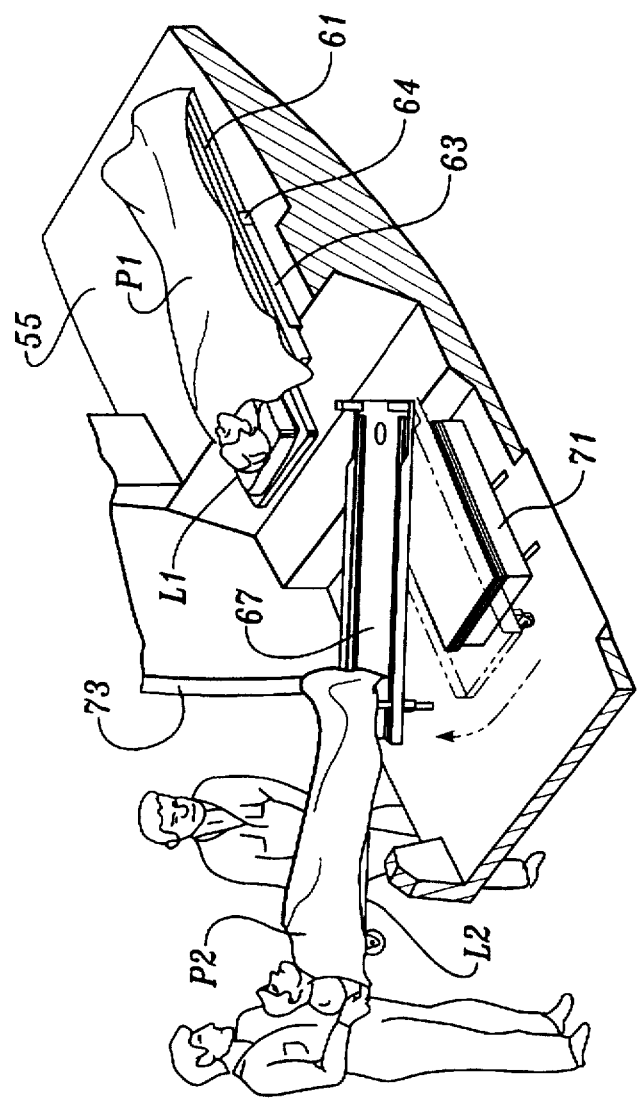
FIG. 7 is a top left perspective illustrating diagrammatically a fifth additional step in the procedure of loading a patient in the patient transport system of the present invention.

As also illustrated in FIG. 6, the carriage and lift assembly 71 is then collapsed such that the lower tray 67 moves from the upper, broken line position to the lowered, solid line position. Then, the head end portion of the lower tray 67 is swung outward to the oblique position shown in FIG. 7, toward the exterior door opening 73. A second patient P2 supported on a litter L2 is loaded onto the lower tray 67 now exposed. If desired, the carriage and lift assembly 71 can be shifted transversely toward the center of the aircraft 21 to position the foot of the lower tray 67 nearer to the exterior door opening 73. Once the second patient litter L2 has been fitted onto the lower tray 67, the litter L2 is locked to the lower tray 67, and the lower tray 67 is swung inward to the longitudinally extending position shown in broken lines in FIG. 7. If the carriage and lift assembly 71 previously was shifted transversely toward the exterior door opening 73, it is shifted back to the leftmost position to provide more room for an attendant or attendants at the right side of the aircraft 21. Both patients, particularly their heads and upper body torsos, are readily accessible to the attendant(s) during transportation to the destination facility. At such facility, the sequence of unloading of the patients is the reverse of the loading procedure described above.

Figure 8:
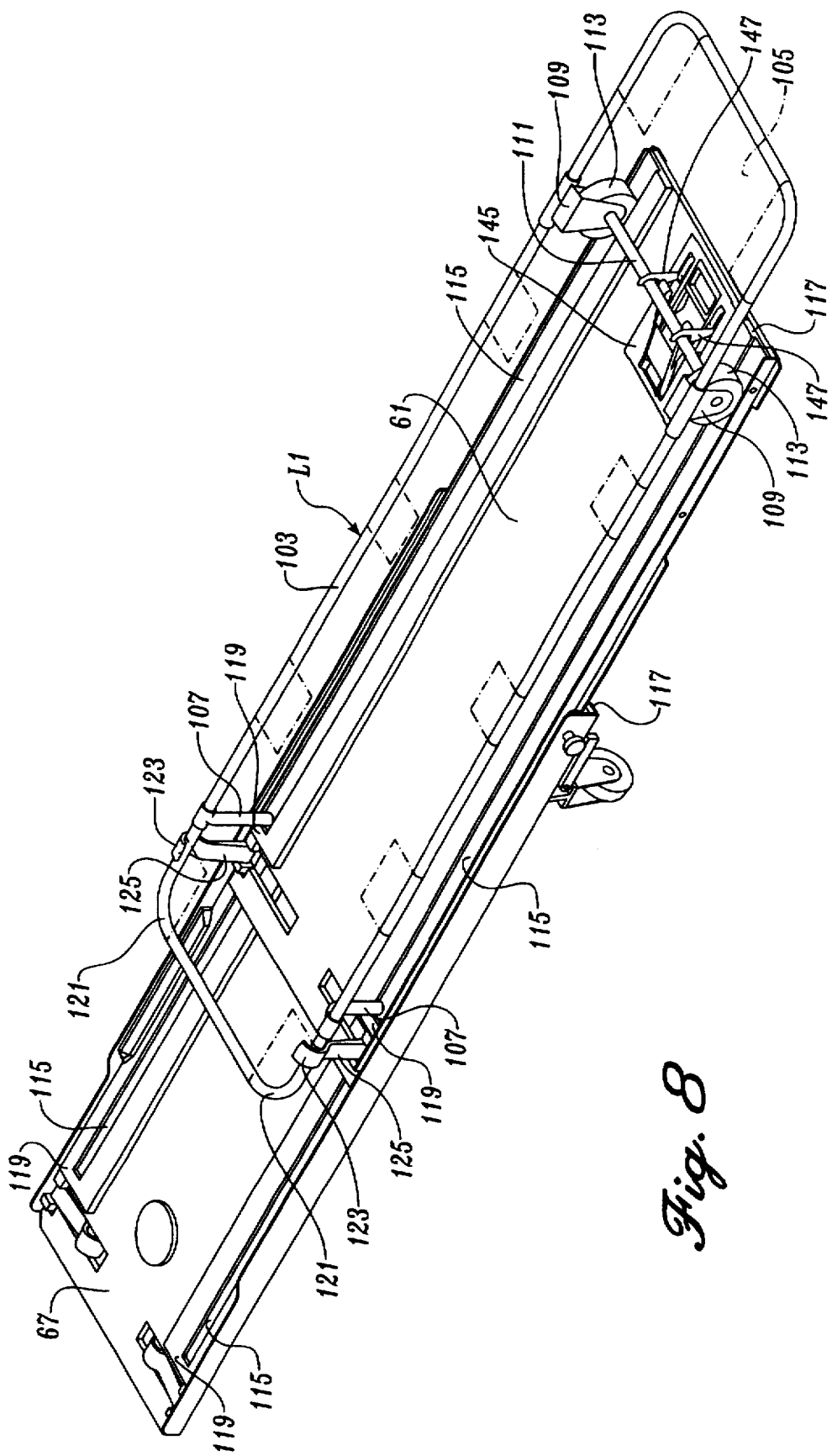
FIG. 8 is a top right perspective of components of a patient transport system in accordance with the present invention, namely, an upper tray fitted within a lower tray and having mechanism for securing a patient litter thereon.

With reference to FIG. 8, prior to transport within a vehicle, such as a helicopter, the standard stretcher or patient litter L1 must be secured on its respective tray 61 or 67. The standard litter L1 includes a generally rectangular, peripheral frame 103 draped with a sheet 105 of canvas or similar material under tension on which the patient lies. Support posts 107 extend downward near the foot end of the frame 103 on the right and left sides. Wheel brackets 109 extend downward near the head end on both sides of the frame. The axle 111 on which the wheels 113 are journaled extends crosswise between brackets 109.

The trays 61 and 67 have identical components for releasably locking the standard litter in position. Each tray 61 and 67 includes a pair of shallow grooves or tracks 115 along its opposite longitudinal sides. The tracks 115 are open at the head ends 117 of the trays 61 and 67 such that the posts 107 can be easily inserted into the tracks 115 when the foot end of the litter L1 is first loaded onto the head end of a tray 61 or 67. Thereafter, the litter L1 can be slid rearward with the tracks 115 guiding rearward sliding movement of the posts 107. The raised edge portions of the tracks 115 limit transverse movement of the posts. The tracks 115 end near the foot end of the tray 61 or 67 where raised stops 119 prevent further rearward sliding movement. In the rearwardmost position of the litter L1 on the tray 61 or 67, posts 107 are engaged against stops 119, and wheels 113 are supported in the tracks 115 at the head end portion of the tray 61 or 67.

As the litter L1 approaches its rearward position on the tray 61 or 67, the corners 121 of the litter frame 103 fit beneath inwardly curved upper end portions 123 of upright retainers 125. Such retainers 125 are positioned at opposite sides of the foot end portion of each tray 61 or 67, adjacent to the raised stops 119. The details of the mounting of the upright retainers 125 are shown in FIGS. 9 and 10. Preferably each retainer 125 is pivotally mounted on its tray 61 or 67 for swinging between a vertical litter-restraining position (shown in broken lines in FIG. 9) and an inwardly swung horizontal position (shown in solid lines) in which the retainer 125 is received in a recess 127 in the upper surface of the tray 61 or 67. The recesses allow the retainers 125 to be folded down sufficiently so that they do not interfere with other components or catch on other objects. This is desirable, for example, with the retainers 125 on the lower tray when the upper tray 61 is slid over the lower tray 67.

As seen in FIG. 10, in the preferred embodiment the base portion 129 of each retainer 125 is fitted between short pivot blocks 131 and 133 mounted forward and rearward, respectively, of the retainers 125. A pivot pin 135 has its opposite ends received in the pivot blocks and extends through the base portion 129 of the retainer 125 to achieve the desired pivotal mounting. In the raised, upright position of the retainer 125, illustrated in broken lines in FIG. 9, the outer side of the retainer 125 engages against an upstanding flange 137 along the adjacent side of the tray 61 or 67. Such flange also defines the outer edge of the longitudinally extending tray groove or track 115. As seen in FIG. 10, a notch 139 can be provided in the forward side of the retainer 125, close to its base portion 129, for receiving the tip of a spring-loaded detent 141 carried in a horizontal bore 143 of the forward pivot block 131. Preferably notch 139 is positioned to receive the detent 141 when the retainer 125 is in its upright position. When the retainer 125 is folded downward and inward, the detent 141 engages over the top of the retainer 125 to releasably maintain the retainer 125 horizontal. As seen in FIG. 9, the hooked end 123 of the retainer projects sufficiently from the tray recess 127 to provide a fingerhold for swinging the retainer from the horizontal position to the vertical position against the action of the spring-loaded detent.

With reference to FIG. 8, the retainers 125 in their upright positions snugly receive the foot end portion of the litter frame 103 at its opposite sides and prevent substantial vertical, transverse, or twisting motion of the litter L1 relative to the tray 61 or 67. At the head end of each tray 61 or 67, an axle lock assembly 145 is provided including hooks 147 movable to a position for grasping the axle 111 to prevent substantial forward or upward shifting of the head end portion of the litter L1. Since rearward movement of the litter L1 is prevented by engagement of the posts 107 against the stops 119, and vertical movement of the foot end of the litter L1 is prevented by the inwardly curved ends 123 of the retainers 125 hooked over the litter frame 103, and transverse movement of the litter L1 is prevented at the foot end by the retainers 125 in combination with the posts 107 fitted in the tracks 115 and, at the head end of the tray 61 or 67, by wheels 113 snugly received in the tracks 115, the axle lock assembly 145 is the final component required to reliably secure the litter L1 to the tray 61 or 67.

Figure 11:
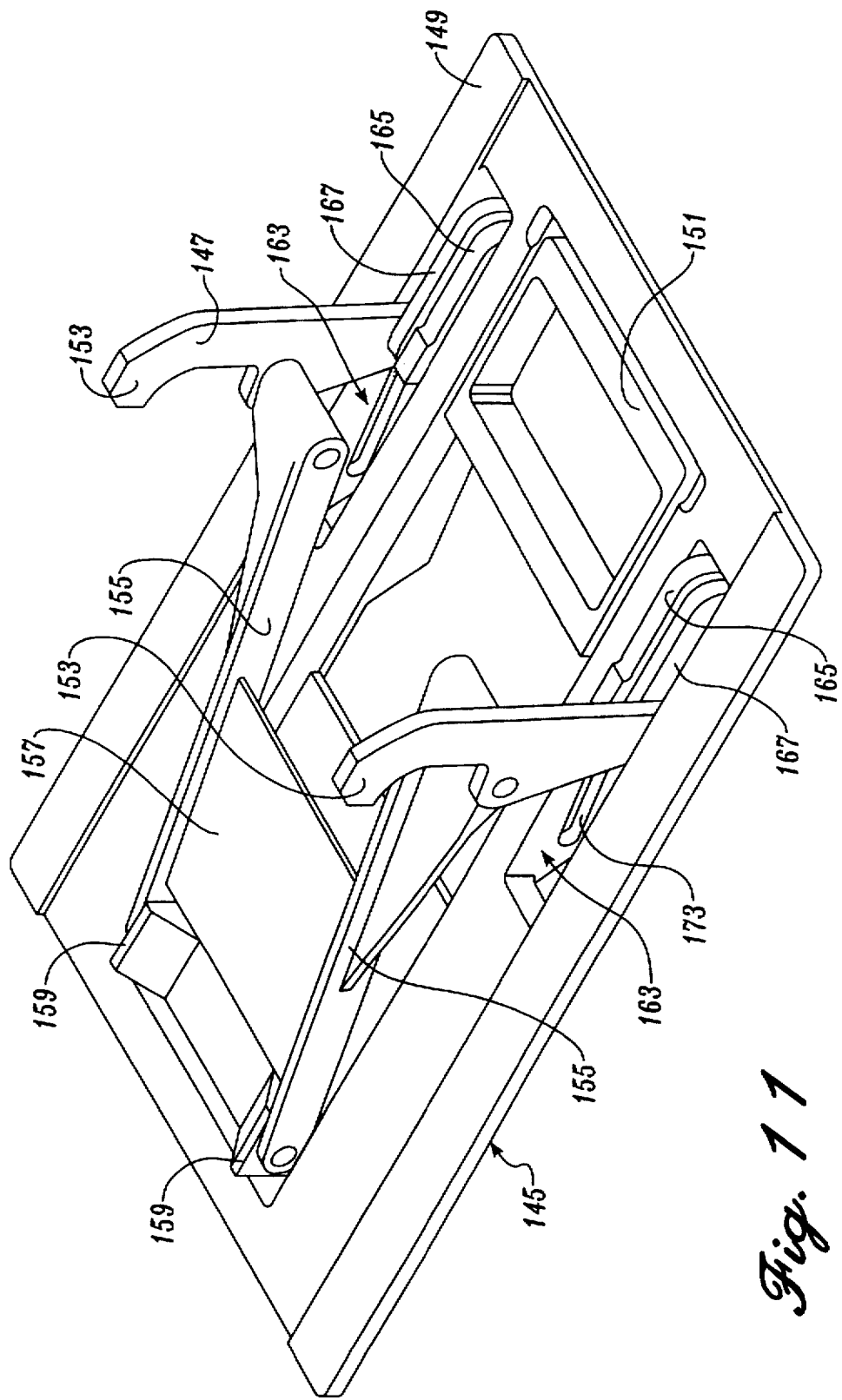
FIG. 11 is a top right perspective of another component of the litter securing mechanism of FIG. 8, namely, an axle locking assembly.

Referring to FIG. 11, the axle lock assembly 145 includes a generally rectangular frame plate 149, the swingable hooks 147, a handle 151 pivotally mounted in the frame plate 149, and a linkage assembly connecting those components. The frame plate 149 is mounted in a recess (not shown) in the top of its respective tray 61 or 67 in the area below the litter axle 111 when the litter L1 is approximately centered over the tray 61 or 67. By manipulation of the handle 151, the hooks 147 are swung between an upright position in which the rearwardly curved upper ends 153 of the hooks 147 are fitted over the axle 111 and a horizontal position in which the hooks 147 are retracted into the frame plate 149. The hooks 147 rotate through an angle of approximately 90° between the upright locking position and the horizontal retracted position.

The linkage assembly by which the hooks 147, frame plate 149, and handle 151 are interconnected includes a pair of generally horizontal arms 155 joined by a transversely extending cross plate 157. The rear ends of the arms 155 project from the cross plate 157 and are pivoted to upright posts 159 formed integrally with or secured to the frame plate 149. The front ends of the arms 155 are pivoted to the central portions of the hooks 147 approximately midway between the top curved end portions 153 and the bottom portions of the hooks 147.

Figure 12:
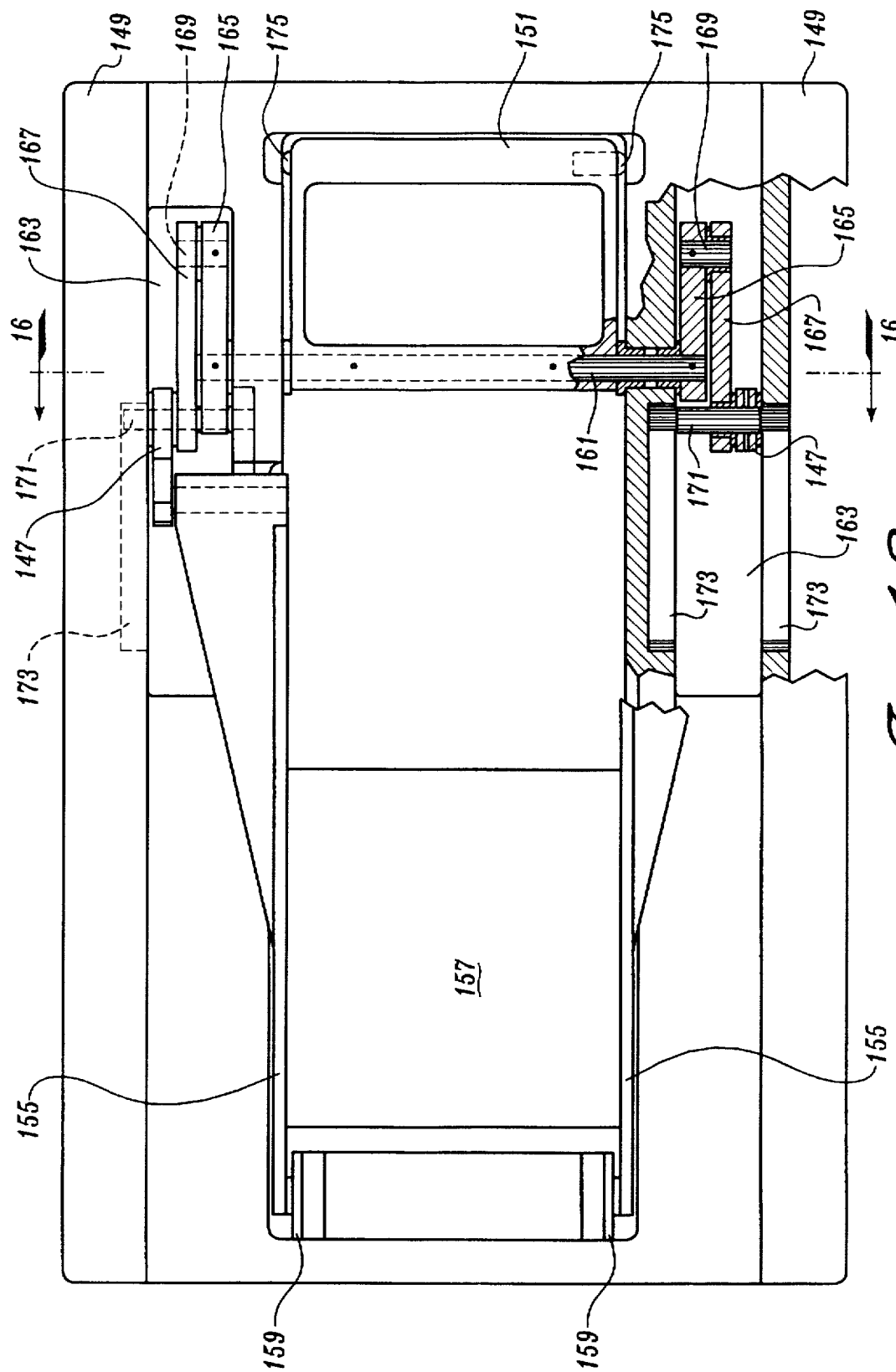
FIG. 12 is a top plan of the axle locking assembly of FIG. 11 with parts broken away.
Figure 13:
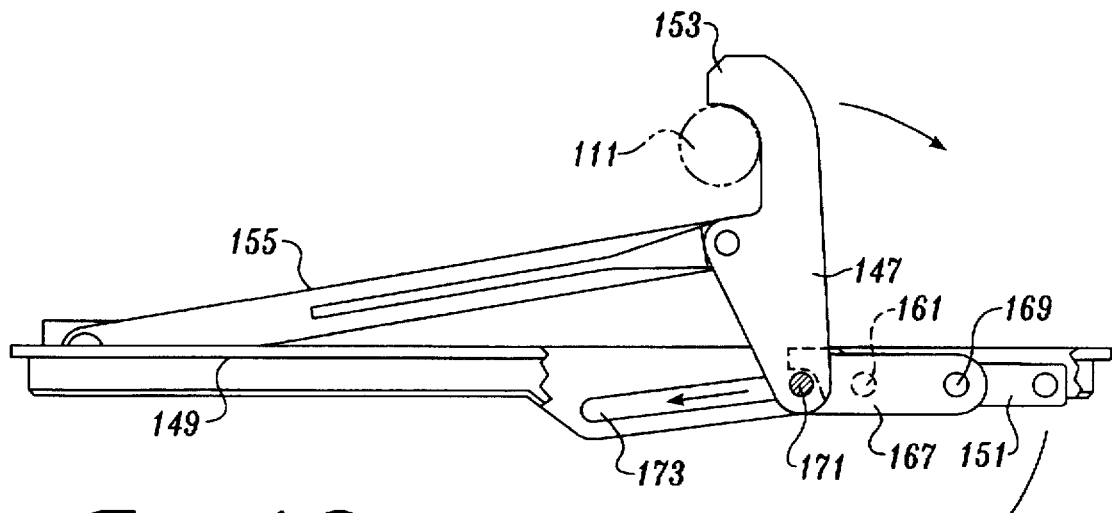
FIG. 13 is a first diagrammatic side elevation illustrating operation of the axle locking assembly of FIGS. 11 and 12, parts being broken away.
Figure 14:
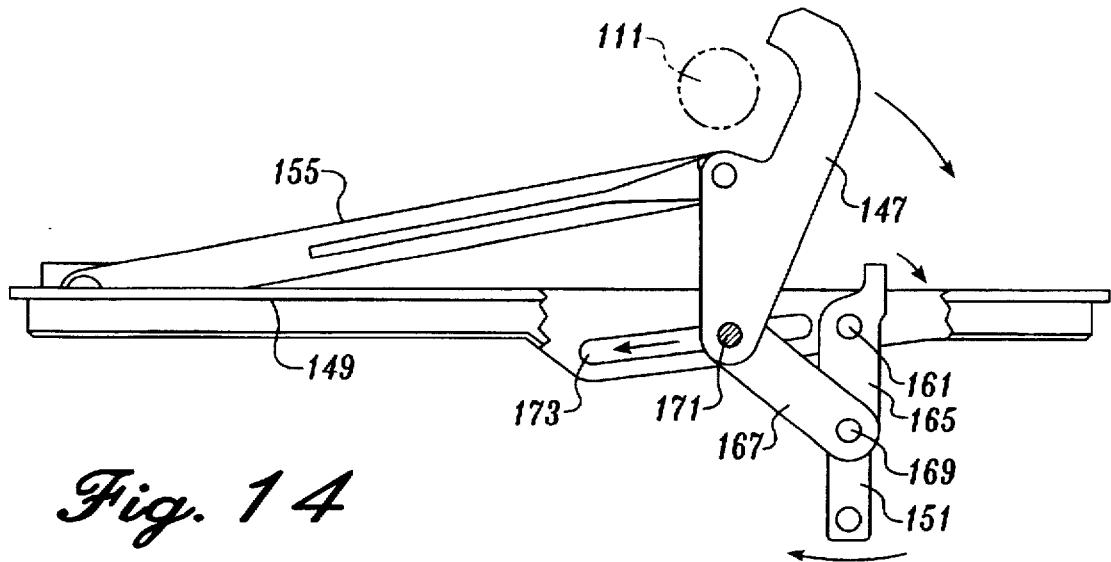
FIG. 14 is a second diagrammatic side elevation illustrating operation of the axle locking assembly of FIGS. 11 and 12, parts being broken away.

As best seen in FIGS. 12, 13 and 14, the handle 151 is pivoted on the frame plate 149 by a horizontal transversely extending shaft 161. As seen in FIG. 12, the shaft 161 projects from the opposite sides of the handle 151 through the adjacent section of the frame plate 149 and into cutouts 163 where the opposite ends of the shaft 161 are fixed to inner links 165. Such links 165 extend in a forward direction from the shaft 161 when the axle hooks 147 are in their locking vertical positions, but rearward when the axle hooks 147 are retracted. The locked position is illustrated in FIGS. 11, 12 and 13.

The ends of inner links 165 remote from the shaft 161, i.e., the swinging ends of the links, are pivotally connected to corresponding ends of outer links 167 by pivot pins 169. The opposite end portions of the outer links 167 are pivotally connected to cross pins 171 projecting transversely from the lower end portions of the axle hooks 147. Cross pins 171 are guided for linear movement essentially fore and aft of the respective tray 61 or 67 in elongated linear slots 173 formed in the frame plate 149.

Figure 16:
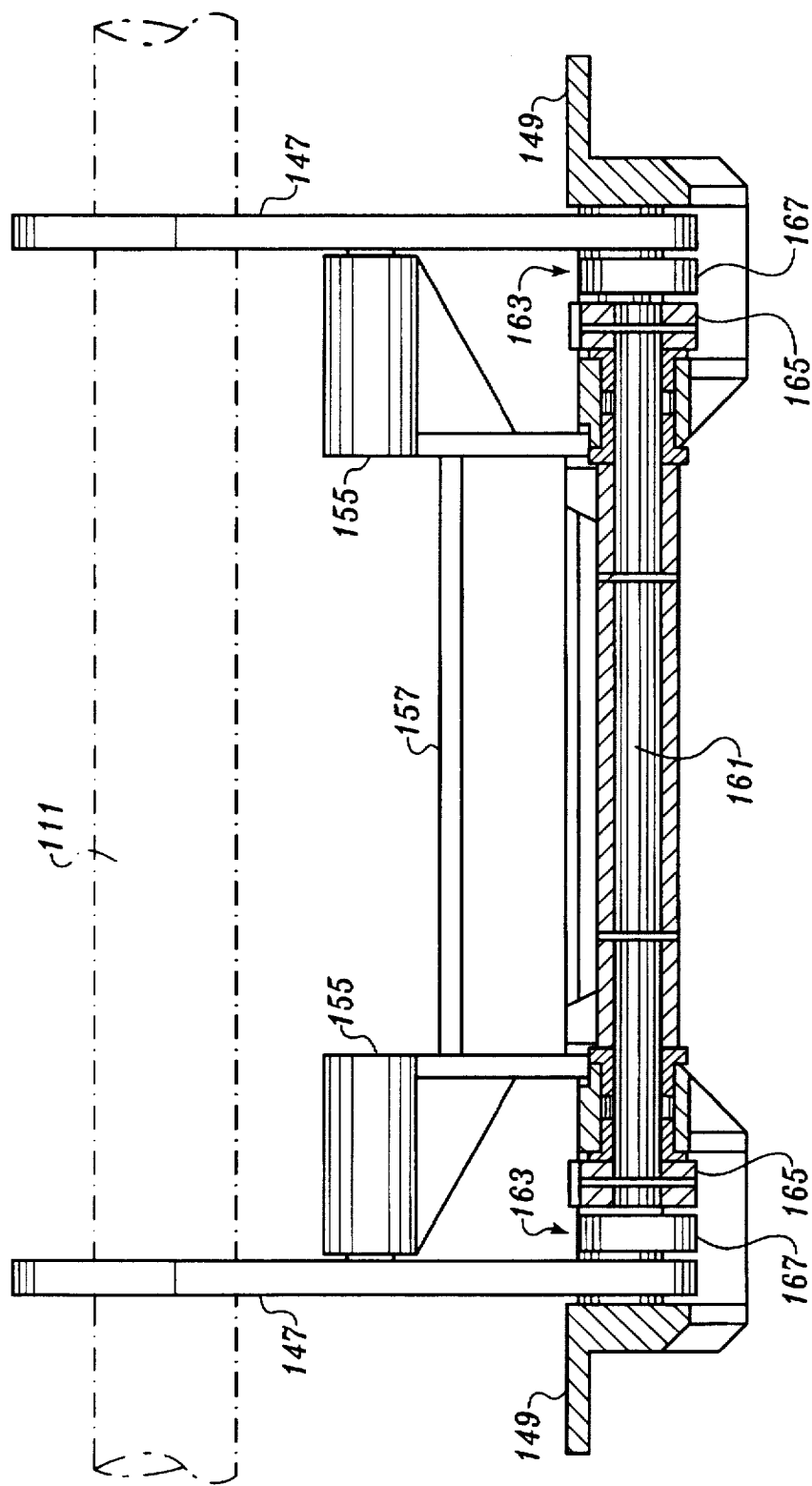
FIG. 16 is a section along line 16—16 of FIG. 12.

FIG. 16 illustrates the relative positions of the axle hooks 147, arms 155 connected by the plate 157, handle shaft 161, inner rotating links 165, and outer sliding links 167. Links 165 and 167 and the bottom portions of the axle hooks 147 all are received within the cutouts 163 of the frame plate 149.

Figure 15:
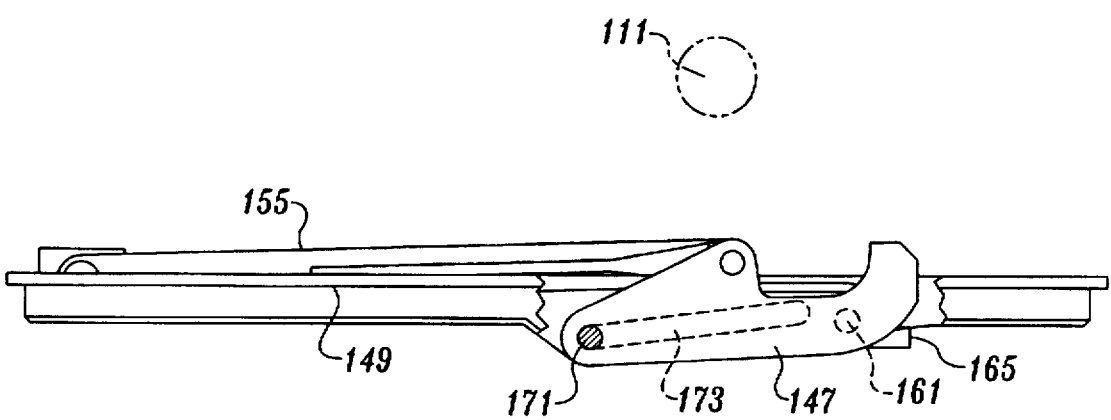
FIG. 15 is a third diagrammatic side elevation illustrating operation of the axle locking assembly of FIGS. 11 and 12, parts being broken away.

Movement of the various components of the axle lock assembly 145 is illustrated in FIGS. 13, 14, and 15. With reference to FIG. 13, when the hooks 147 are in their vertical locking positions with the rearwardly curved upper ends 153 fitted over the litter axle 111, arms 155 are inclined forward and upward at a small acute angle relative to the frame plate 149 and the upper surface of the tray 61 or 67 in which the frame plate 149 is mounted. Handle 151 extends forward from its shaft 161 on which the inner rotating link 165 (not visible in FIG. 13 but seen in FIG. 14) is carried. The outer sliding link 167 extends from pivot pin 169 rearward to the cross pin 171 projecting from the bottom end portion of the hook 147. In the position illustrated in FIG. 13, i.e., the vertical locking position for the axle hook 147, the links 167 hold the cross pins 171 in the forward end portions of the elongated slots 173.

Figure 21:
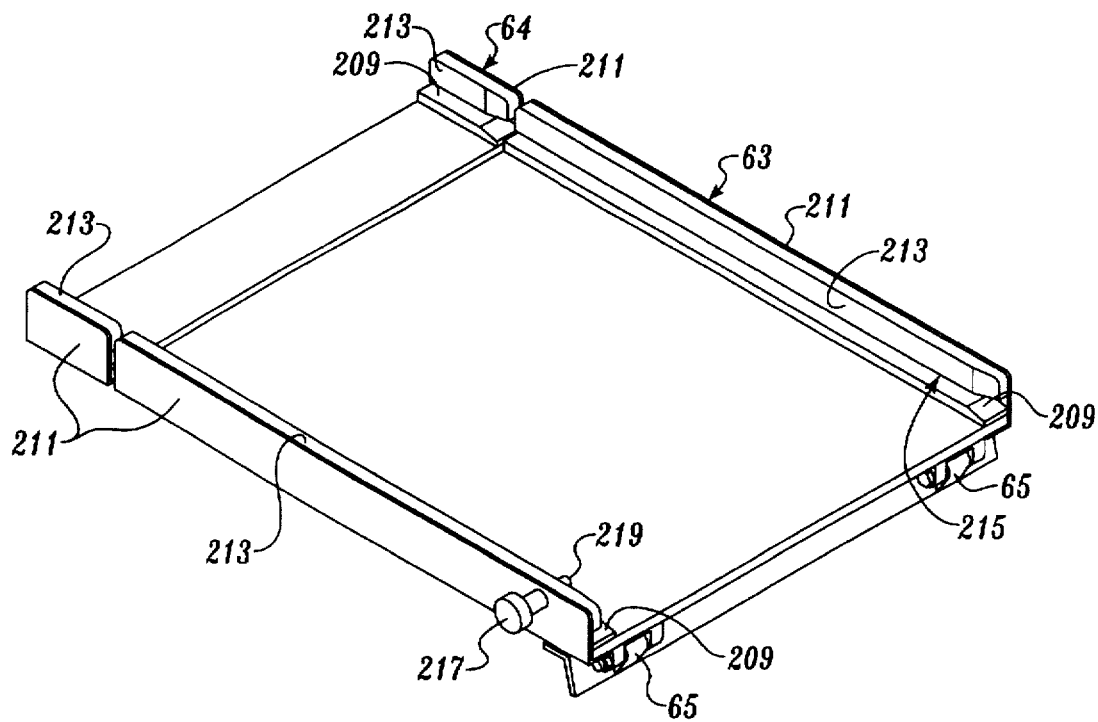
FIG. 21 is a top right perspective of an additional component of the patient transport system in accordance with the present invention, namely, a bedplate for retaining the upper tray when separated from the lower tray.

As seen in FIG. 14, in order to retract the axle hooks 147 to release the axle 111 of the litter L1, the handle 151 is rotated clockwise as viewed in FIGS. 13 and 21 about its shaft 161. The inner links 165 rotate with the handle 151 and thrust the outer links 167 rearward, thereby moving cross pins 171 rearward in the slots 173. Approximately 180° rotation of the handle 151 is required in order to move the pins 171 to the rear end portion of the slots 173. Such motion rotates the axle hooks 147 clockwise and retracts them into the frame plate 149 as the arms 155 swing downward through a small angle toward the top of the frame plate 149. The fully retracted position is illustrated in FIG. 15.

As seen in FIG. 12, handle 151 can carry spring loaded detent fingers 175 engageable in notches of the frame plate 149 to maintain the handle 151 in the locked position. Similar notches can be provided toward the central portion of the frame plate to hold the handle in the rearward swung, released position.

The result is that the patient litter L1 can be quickly and easily inserted on and locked to a tray 61 or 67 during loading of a patient, and just as easily be released for unloading of the patient at the destination facility.

Referring back to FIG. 8, after the patient litter L1 is locked in place on the upper tray 61, the upper tray can be retracted into the lower tray 67. If only one patient is being transported, the two trays 61 and 67 remain nested together. However, if more than one patient is to be transported within the same vehicle, it will be necessary to separate the upper and lower trays 61 and 67 respectively and, preferably, to position the upper tray 61 above and behind the lower tray 67.

Figure 17:
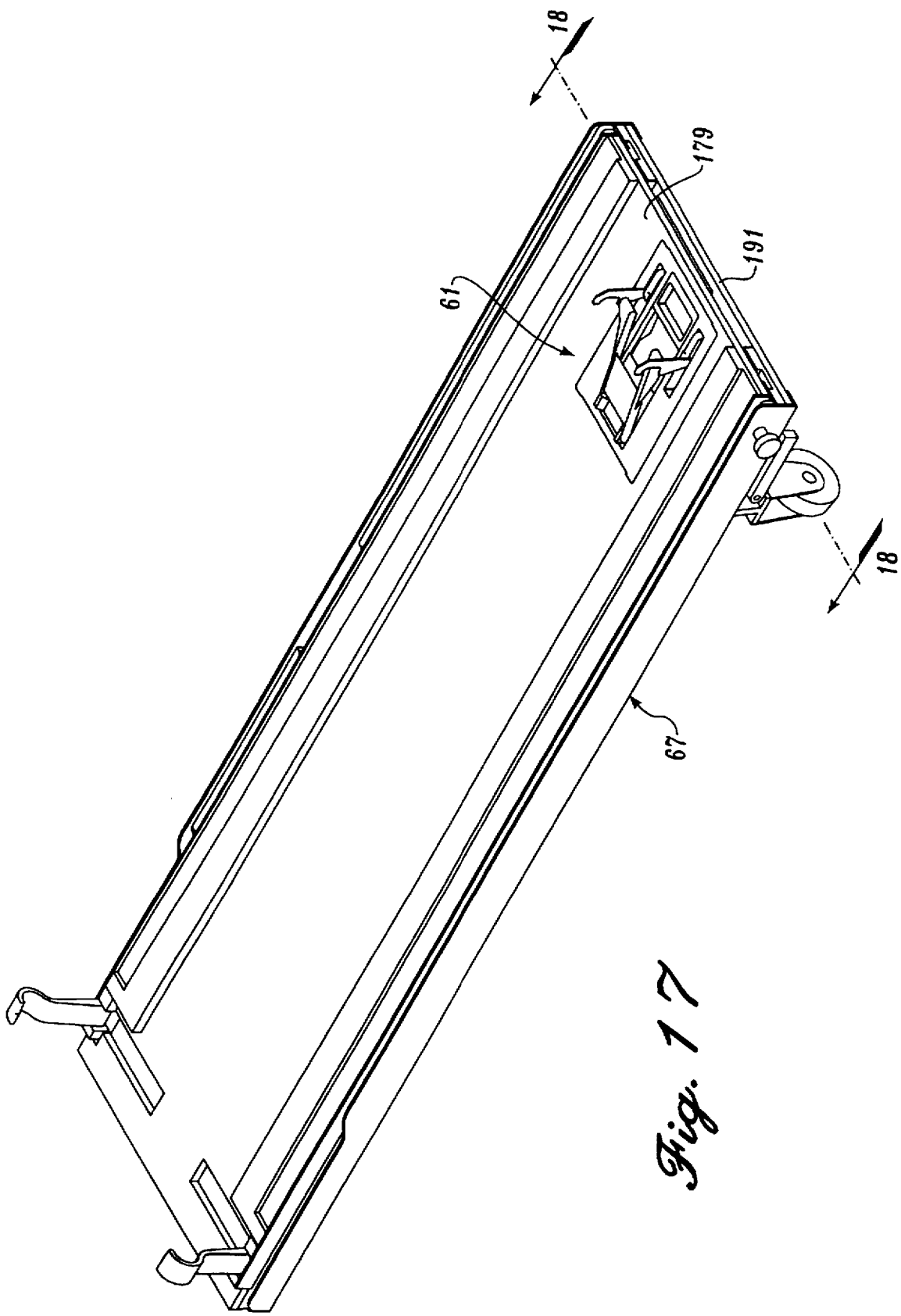
FIG. 17 is a top right perspective of the litter supporting upper tray and lower tray referred to above in connection with FIG. 8.
Figure 18:
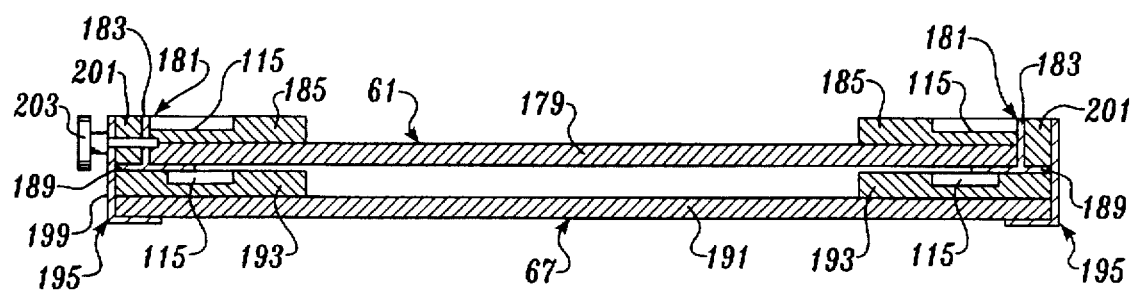
FIG. 18 is a vertical section along line 18—18 of FIG. 17.
Figure 19:
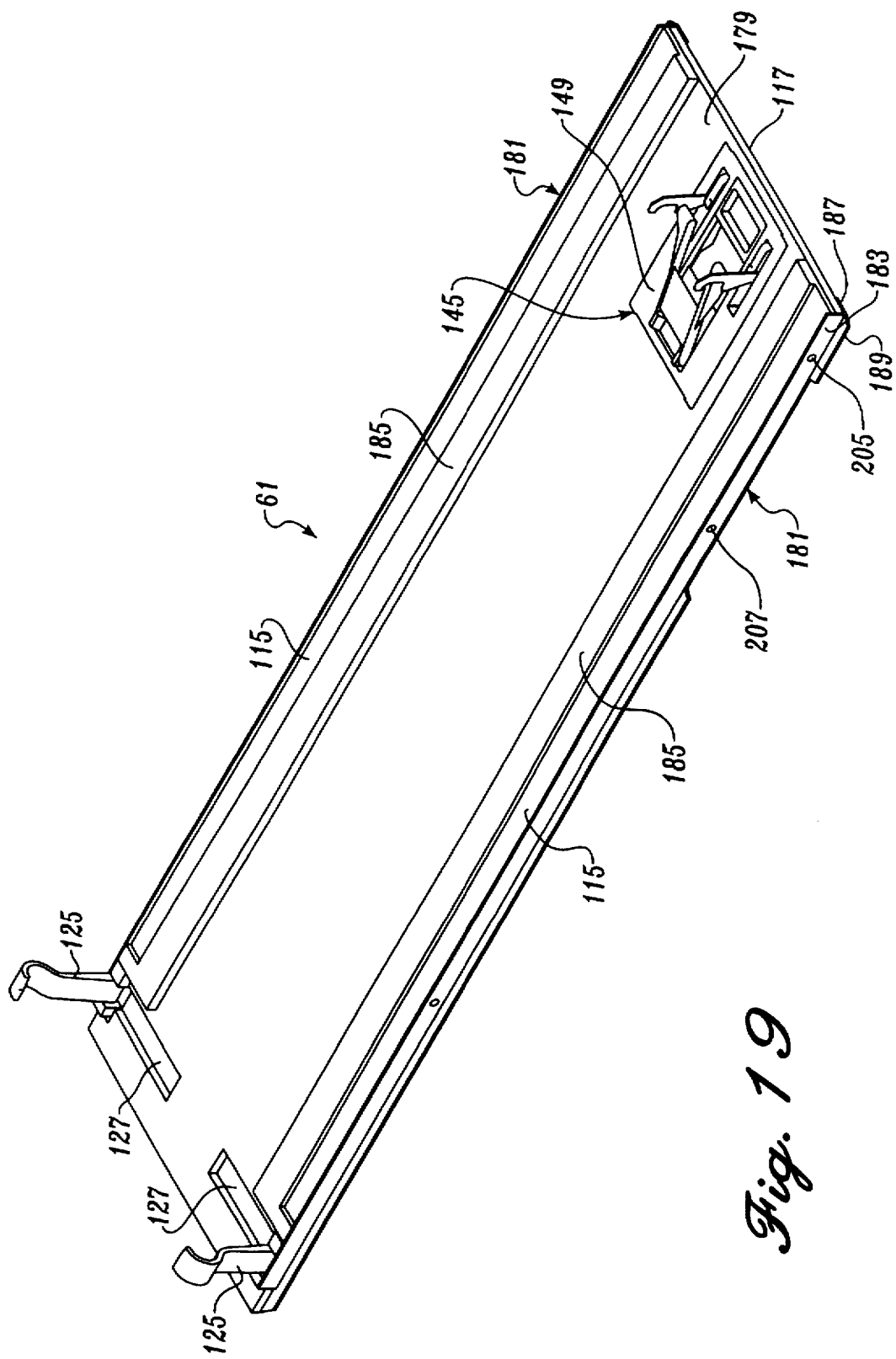
FIG. 19 is a top right perspective of the upper tray of FIG. 17 separated from the lower tray.
Figure 20:
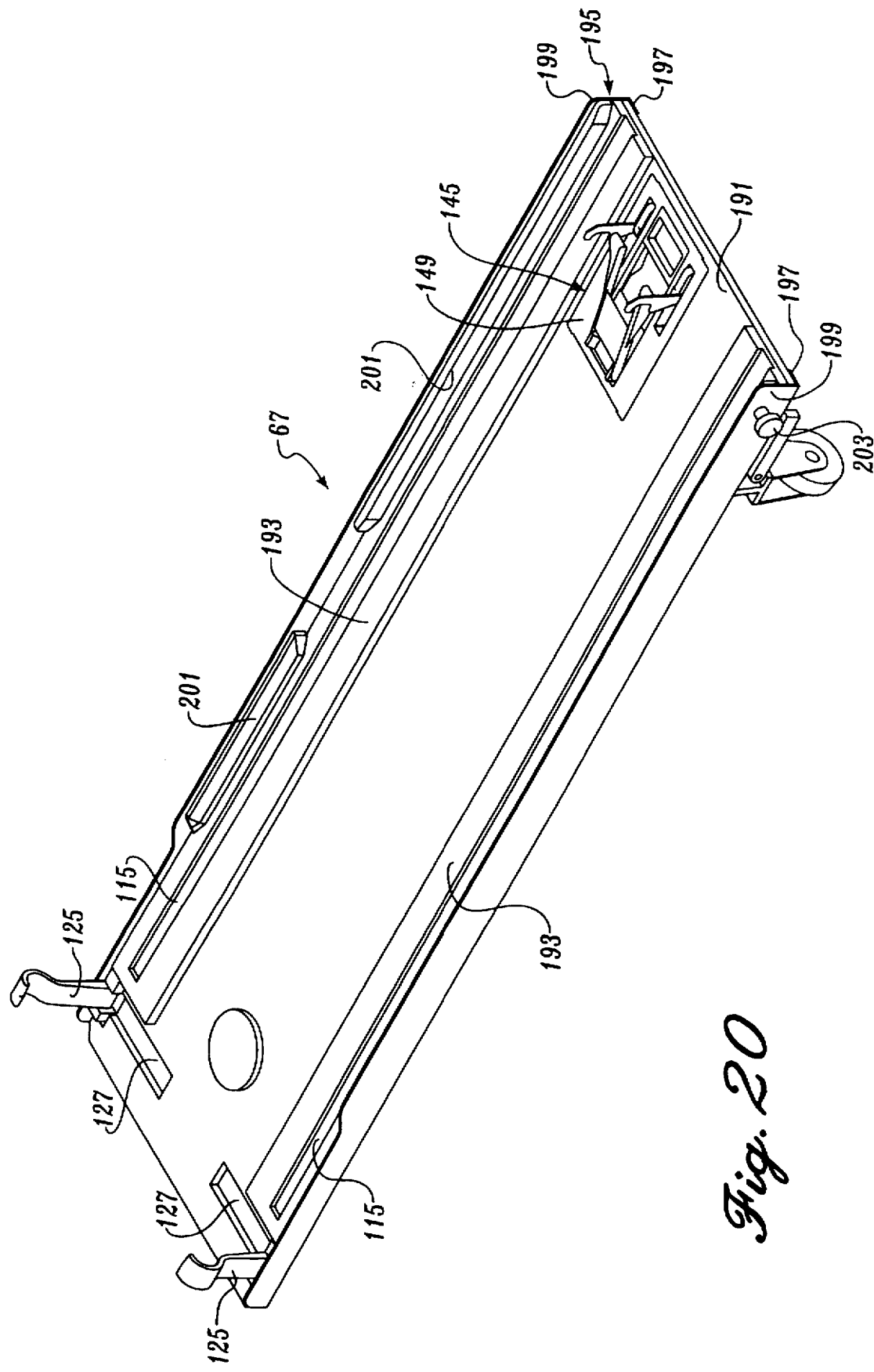
FIG. 20 is a top right perspective of the lower tray of FIG. 17 separated from the upper tray.

Several elements are included in both the upper and lower trays 61 and 67 respectively to accomplish the proper nesting and separation of the trays 61 and 67. FIGS. 17 and 18 illustrate the interconnection of the upper tray 61 with the lower tray 67, whereas FIG. 19 shows the upper tray 61 separated from the lower tray 67, and FIG. 20 shows the lower tray 67 separated from the upper tray 61. As best seen in FIG. 19, the upper tray 61 includes a central rigid panel 179 having the recesses 127 for retainers 125 and a cutout for the axle lock assembly 145 including its frame plate 149. Inverted T slide strips 181 extend along the right and left sides of the tray panel 179. Each slide strip 181 includes an upright web portion 183 extending upward beyond short elongated edge blocks or strips 185. The strips 185 are notched to form the shallow tracks 115. The webs 183 border the outer sides of the tracks 115 of the upper tray 61. The slide strips 181 also include inward-extending arms 187 secured to the marginal portions of the underside of the tray panel 179 and outward-extending arms 189 projecting outward from the bottom of the vertical web 183.

As best seen in FIGS. 18 and 20, the lower tray 67 includes a central panel 191 having the recesses 127 (FIG. 20) for the associated litter retainers 125 and a cutout for the axle lock assembly 145 including its frame plate 149. These aspects of the lower tray 67 are identical to the corresponding parts of the upper tray 61. However, the panel 191 of the lower tray 67 is wider than the panel 179 of the upper tray 61, and the tracks 115 of the lower tray 67 (which must be spaced apart the same distance as the tracks for the upper tray 61) are fully formed in the long edge pieces 193 secured to the upper longitudinal margins of the panel 191. Structural angular strips 195 extend along the opposite edges of the panel 191, including inward extending arms or flanges 197 secured to the bottom longitudinal margins of the panel 191 and the upward extending flanges 199 that project above the tops of the edge pieces 193. The flanges 199 carry inward-projecting rails 201 which are spaced above the tops of the edge pieces 193 to form inwardly opening channels.

As seen in FIG. 18, the channels between the edge pieces 193 and rails 201 are sized to receive the outwardly projecting cross arms 189 of the inverted T slide strips 181. In addition, the webs 183 of such strips 181 are in close proximity to the inner edges of the rails 201. The result is a sliding, interfitting connection of the upper tray 61 over the lower tray 67.

As seen in FIG. 20, the lower tray 67 has a locking pin 203 extending inward through one of the flanges 199 at the head end portion of the lower tray 67. The shank of the pin 203 is positioned and sized to fit in holes 205 and 207 (shown in FIG. 19) in the upright web portions 183 of the inverted T slide strip 181 at the same side. By fitting the locking pin 203 in the hole 205 adjacent to the head end 117 of the upper tray 61, the upper tray 61 is locked in position substantially registered over the lower tray 67. In order to extend the upper tray 61 for loading of a patient, the locking pin is withdrawn, and the upper tray 61 is slid forward relative to the lower tray 67 until the pin 203 registers with the hole 207, whereupon the pin 203 is reinserted to lock the upper tray 61 in the forward or outward shifted position.

Figure 22:
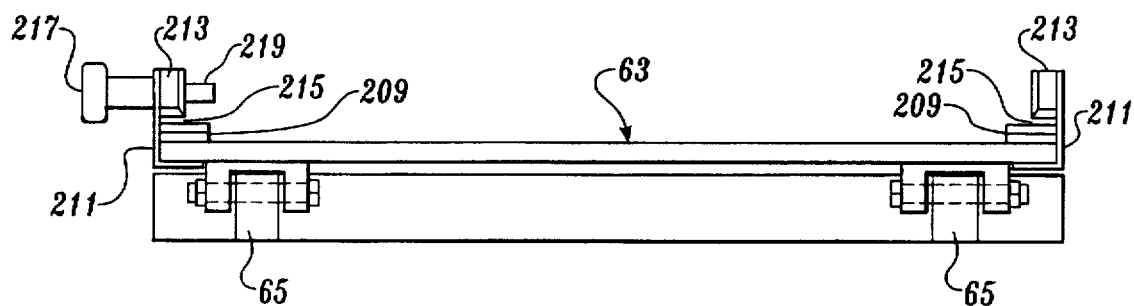
FIG. 22 is an end elevation of the bedplate of FIG. 21.

When the upper tray 61 is transferred from the lower tray 67 to the deck-mounted bedplate assembly 63, 64, the interconnection of the upper tray with the bedplate assembly is substantially the same as the interconnection of the upper tray 61 with the lower tray 67. With reference to FIGS. 21 and 22, as previously described the front plate 63 is connected to the upper deck 55 by hinges 65. The rear plate 64 is stationarily secured to the deck 55. Both portions have short edge strips 209 secured to the top longitudinal margins of the bedplates 63, 64, and angular structural members 211 which correspond to the angular structure members (195) of the lower tray 67. Rails 213 are supported on the upward-extending flanges of structural members 211, spaced above the tops of the edge strips 209 to form channels 215 opening inward toward the center of the bedplates 63, 64. Also, the forward bedplate 63 includes a locking pin 217 corresponding to the locking pin 203 of the lower tray 67, including a shank 219 fittable into the holes 205 and 207 (FIG. 19) of the upper tray 61.

Figure 23:
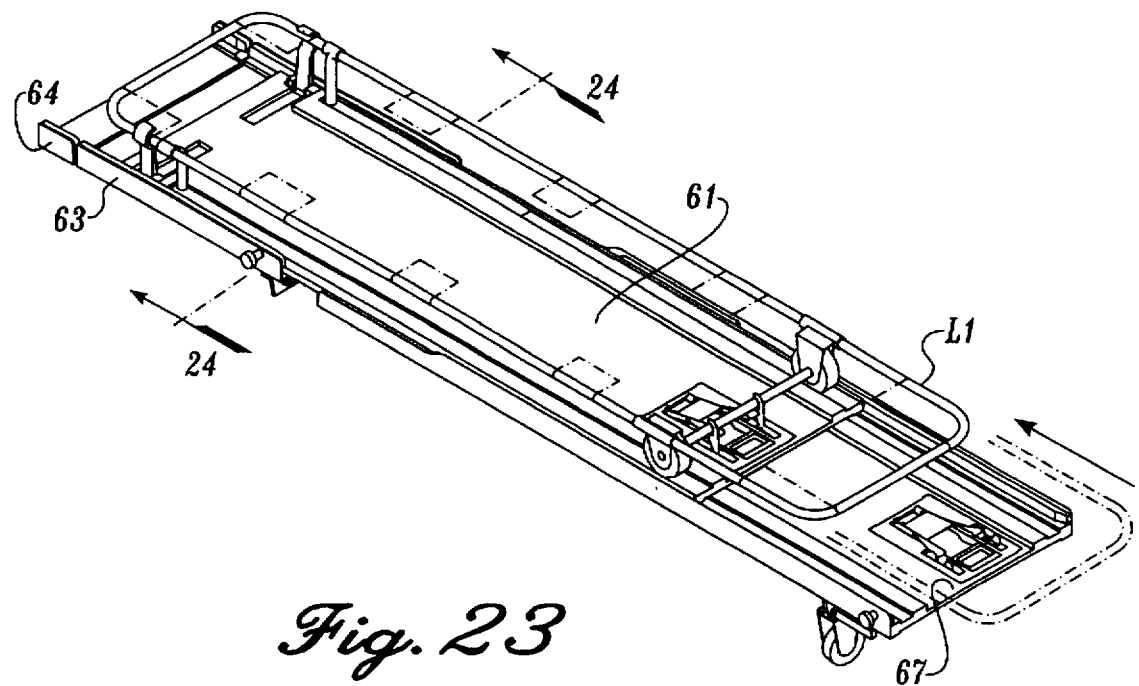
FIG. 23 is a top right perspective of interfitted components of the patient transport system of the present invention, namely, a lower tray and a litter supporting upper tray in the process of being transferred from the lower tray to a bedplate.
Figure 24:
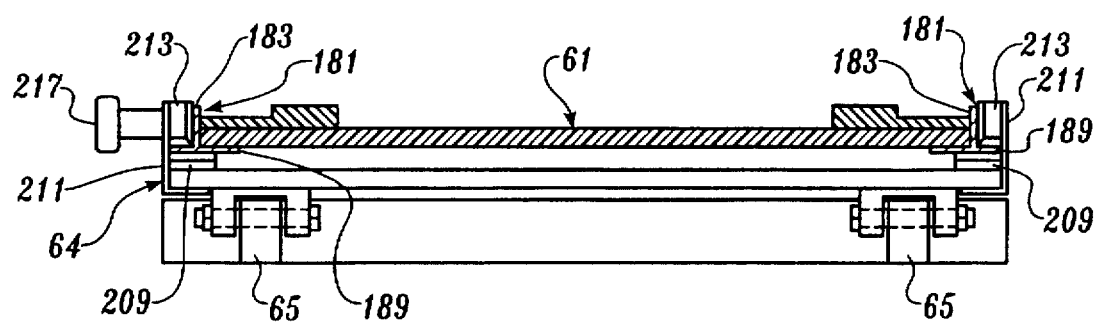
FIG. 24 is a vertical section along line 24—24 of FIG. 23.

FIG. 23 illustrates the upper tray 61 carrying the first patient litter L1 being transferred from the lower tray 67 to the bedplates 63, 64. As seen in the sectional view of FIG. 24, the inverted T slide strips 181 rest on the edge strips 209 of the bedplate 63, 64, with the outward projecting cross arms 189 fitted in the channel between the rails 213 and the support strips 209, and the upright webs 183 close alongside the rails 213. When the transfer of the upper tray 61 onto the bedplate 63, 64 has been completed, such that the lower tray 67 is no longer interengaged with the upper tray 61, the lower tray 67 can be separated from the upper tray 61 by collapsing the lift assembly 71 on which the lower tray 67 is mounted. The rear stationary bedplate 64 prevents the front bedplate 63 from swinging. Also, the locking pin 217 of the bedplate 63 can be used to secure the upper tray 61 in position interlocked with the bedplate 63, 64.

Figure 25:
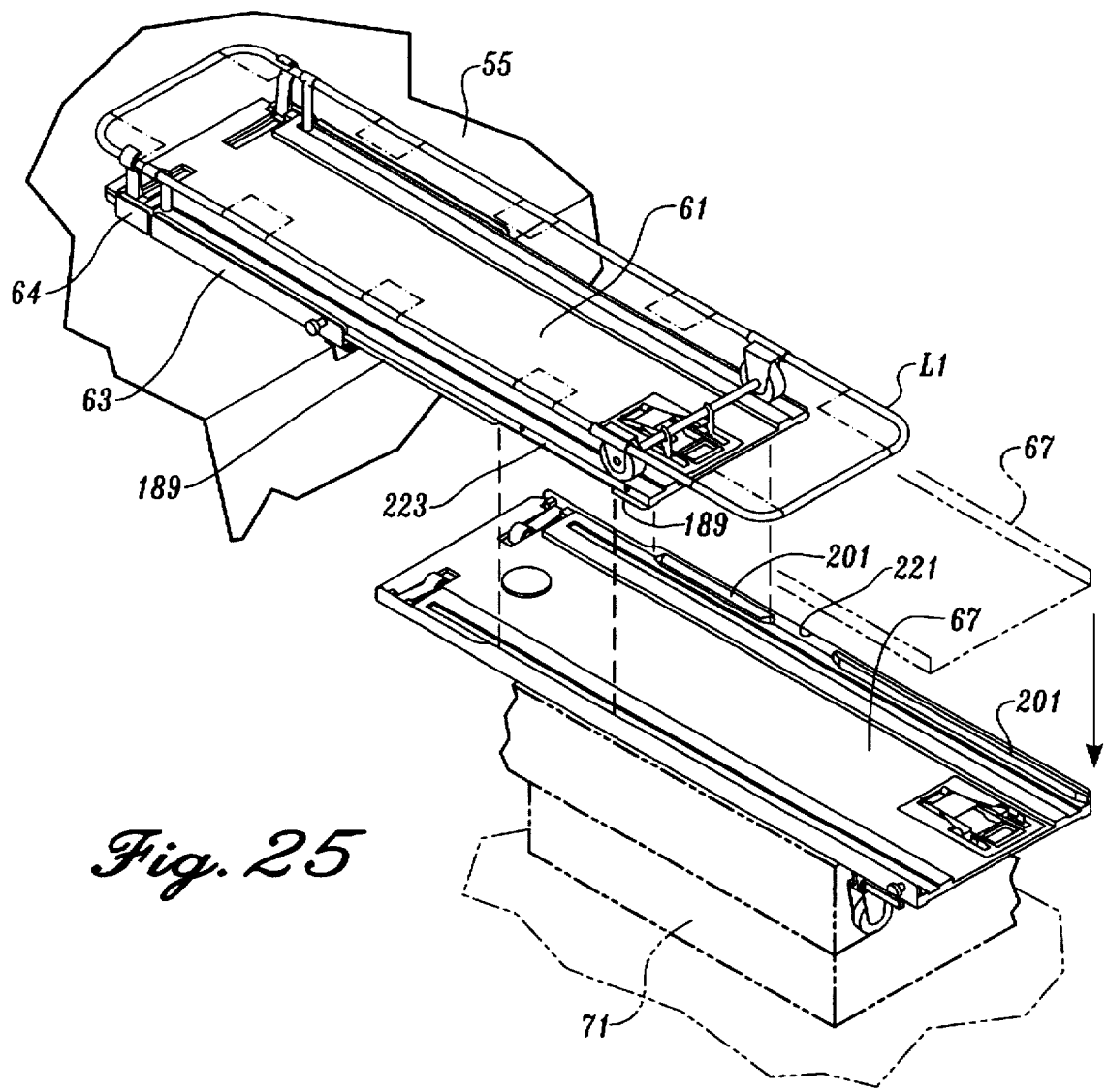
FIG. 25 is a top right perspective of the components of the present invention illustrated in FIG. 23, but with parts in different positions.

As illustrated in FIG. 25, it is not necessary to move the upper tray 61 all the way off of the lower tray 67 in order to disengage it from the lower tray 67. Preferably the rails 201 of the lower tray 67 are not continuous along each side, but rather have at least one space 221 at each side between adjacent strips of the rails 201. Similarly, the outward extending cross arms 189 of the upper tray 61 are not continuous but preferably have a notch 223 which, when the upper tray 61 has reached a predetermined position relative to the lower tray 67, is registered with one of the rail strips 201. The strips 201 and cross arms 189 are spaced to allow the trays 61 and 67 to be separated when the upper tray 61 still partially overlies the lower tray 67.

The nesting of the upper tray 61 in the lower tray 67 allows both trays 61 and 67 to be stowed together without taking up additional room for the second tray. Because of this arrangement, both trays 61 and 67 can be easily and conveniently left within the vehicle ready for use if needed without getting in the way or causing obstruction when not needed.

Figure 26:
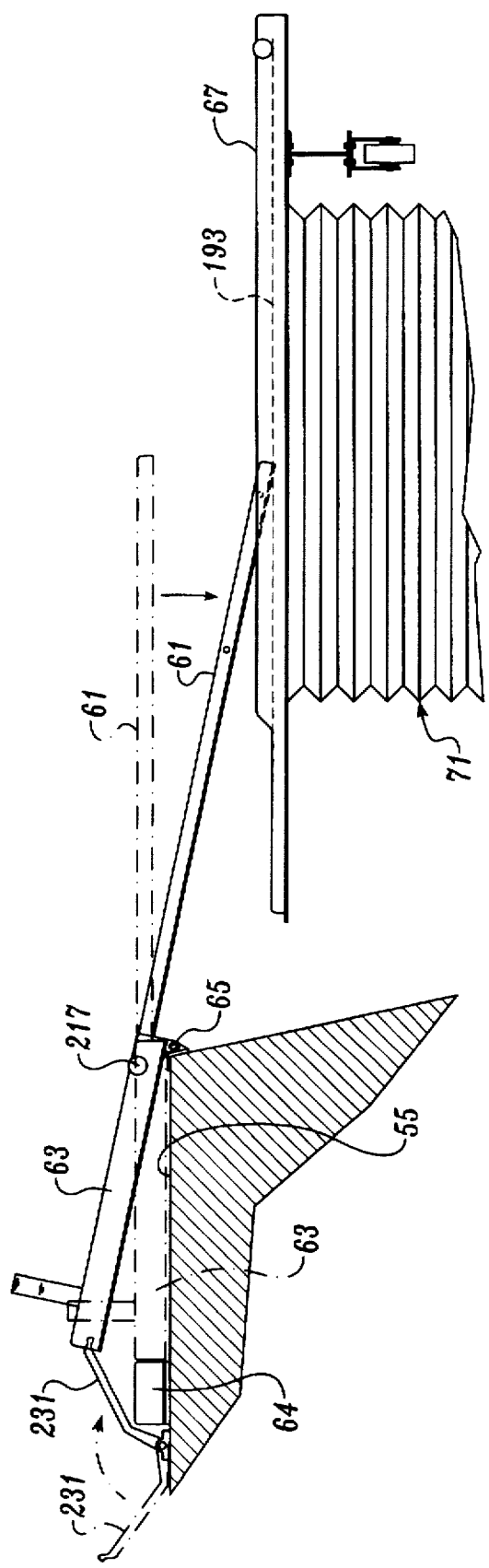
FIG. 26 is a diagrammatic, fragmentary, side elevation of components of the patient transport system in accordance with the present invention, including a lift assembly for a lower tray.

The fit of the upper tray 61 in the lower tray 67 and in the bedplate 63, 64 is quite snug. One advantage of the pivotal mounting of the front bedplate 63 on the upper rear deck 55 of the aircraft 21 is to allow for some variation in the position of the lower tray 67 supported by the carriage and lift assembly 71 when the transfer of the upper tray 61 to the front bedplate 63 is made. In addition, as illustrated diagrammatically in FIG. 26, such pivotal connection of the front bedplate 63 to the upper rear deck 55 by hinges 65 permits an alternative carrying position for a single patient. It sometimes is desirable to maintain a traumatized patient at a slightly inclined angle, usually with his or her head below their feet. In accordance with the present invention, the upper tray 61 can be partially transferred into the front bedplate 63 and the locking pin 217 actuated to prevent further longitudinal adjustment of the position of the upper tray 61 to engage in a hole provided in the side of the upper tray 61 toward its foot end. Then the carriage and lift assembly 71 can be partially collapsed to lower the lower tray 67, which will have the effect of tilting the upper tray 61. A latch 231 can be provided on the upper rear deck 55 adjacent to the bedplate 63 to prevent swinging of the bedplate and the upper tray 61 interlocked therewith beyond a predetermined angle.

FIGS. 27 through 31 illustrate the preferred carriage and lift assembly 71 in accordance with the present invention. Such assembly 71 includes a bottom rectangular frame 243 and a top rectangular frame 245. The top rectangular frame 245 carries a support plate 247 on which the lower tray 67 is mounted.

The frames 243 and 245 are interconnected by pairs of cross links 249 and 251. The links 251 have their bottom end portions 253 pivoted to the bottom frame 243 toward its forward end. The links 249 have their forward end portions 255 pivoted to the upper frame 245 at its forward end. The links 249 and 251 are provided at both the left and right sides of the carriage and lift assembly 71. The links 249 and 251 at each side have their central portions connected by a pivot 257.

The rear end portions of the links 249 and 251 carry rollers received in horizontal channels, namely, channels 259 carried by the bottom frame for receiving rollers projecting from the rear ends of the rearward and downward inclined links 249 and channels 261 secured to the top frame 245 and receiving rollers projecting from the rear ends of the upward and rearward inclined links 251.

The lift jack 263 for the carriage and lift assembly 71 is supported in the base frame 243 and includes an electric ram 265. Thus, the carriage and lift assembly includes an electric jack. The electric ram 265 is pivotally supported on the front portion of the base frame 243 and has a rearwardly extending spindle 267 pivotally connected to a cross member 269 (FIG. 28) extending between the lower, rearward end portions of links 249. For safety, the mechanical components of the carriage and lift assembly 71 are enclosed in a pleated bellows 273.

The end portions of the cross links 249 and 251 define a parallelogram. The horizontal dimension of the parallelogram is directly controlled by the lift jack 263. Retraction of the spindle 267 of the lift jack decreases the horizontal extent of the parallelogram, thereby increasing the angle of inclination of the links 249 and 251 and raising the top rectangular frame 245 and the support plate 247 carried thereon. Similarly, extension of the spindle 677 of the lift jack 263 has the effect of decreasing the angle of inclination of the cross links 249 and 251 and lowering the support plate 247.

Figure 28:
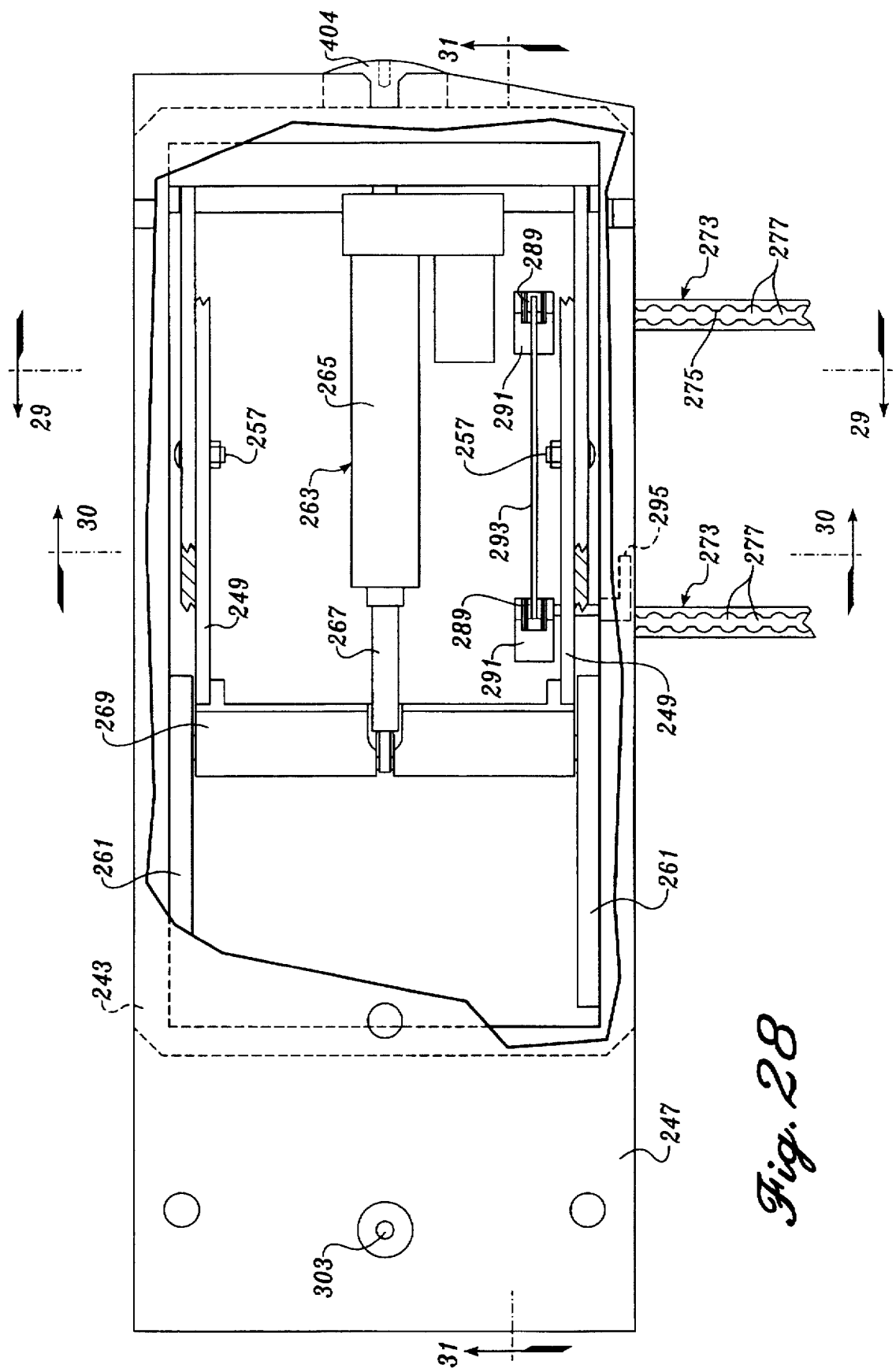
FIG. 28 is a top plan of the lift assembly of FIG. 27 with parts broken away.

The carriage and lift assembly 71 preferably is mounted in the aircraft 21 for movement along conventional floor tracks 273 of a type commonly used in aircraft floors 31 for securing cargo or adjusting the position of passenger seats, for example. As seen in FIG. 28, such tracks 273 include a continuous central channel portion 275 and regularly spaced circular apertures 277. In accordance with the present invention, the carriage lift assembly 71 is supported in the tracks 273 on wheels 279, best seen in FIGS. 29 and 30. Such wheels 279 are mounted on the base frame 243 by wheel brackets 281. The wheels 279 are sufficiently narrow so as to roll in the continuous channel 275 (FIG. 28) of the floor tracks 273, for adjusting the position of the carriage and lift assembly 71 transversely of the aircraft 21.

Figure 27:
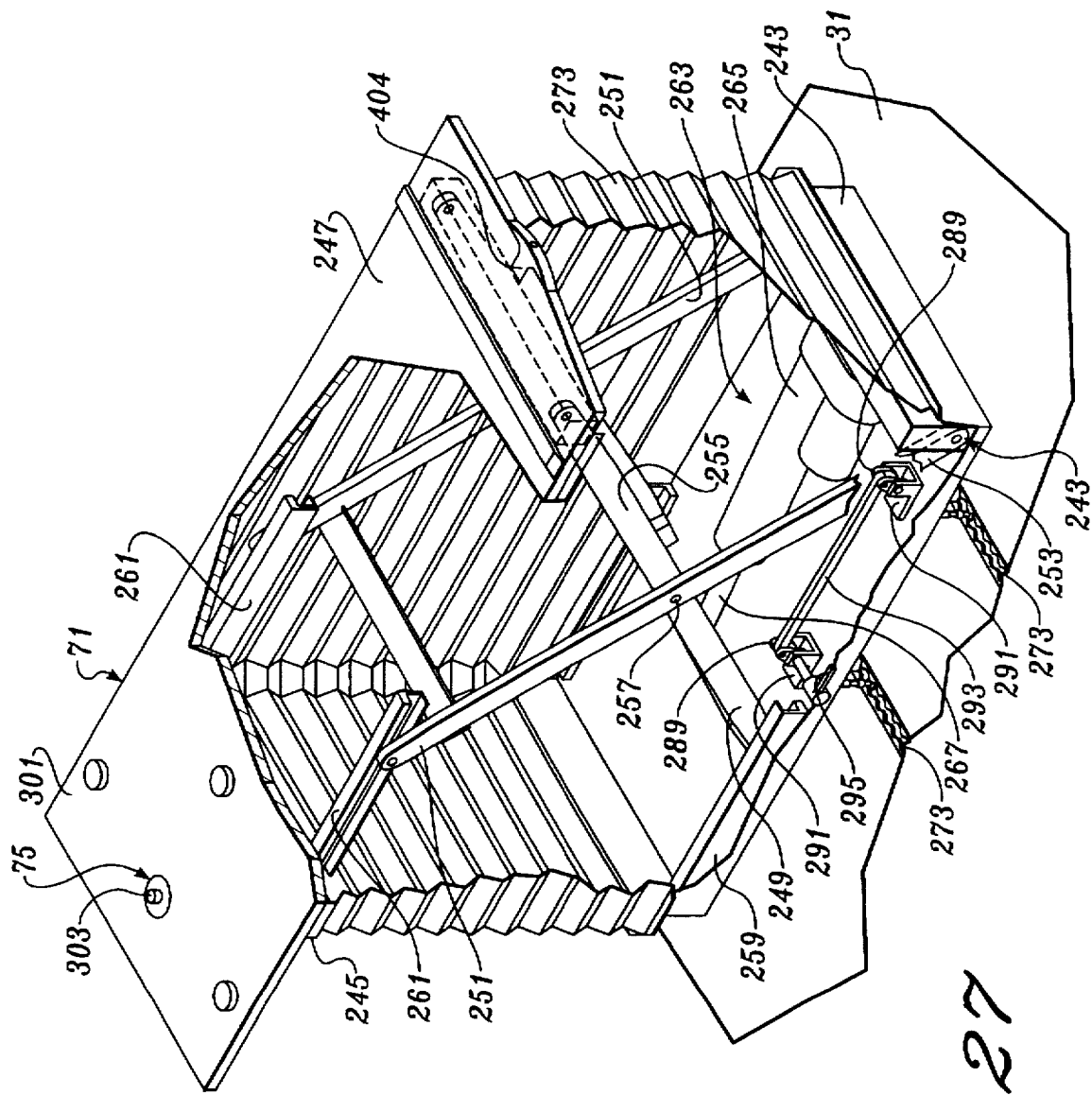
FIG. 27 is a top right perspective of the lift assembly of FIG. 26.
Figure 29:
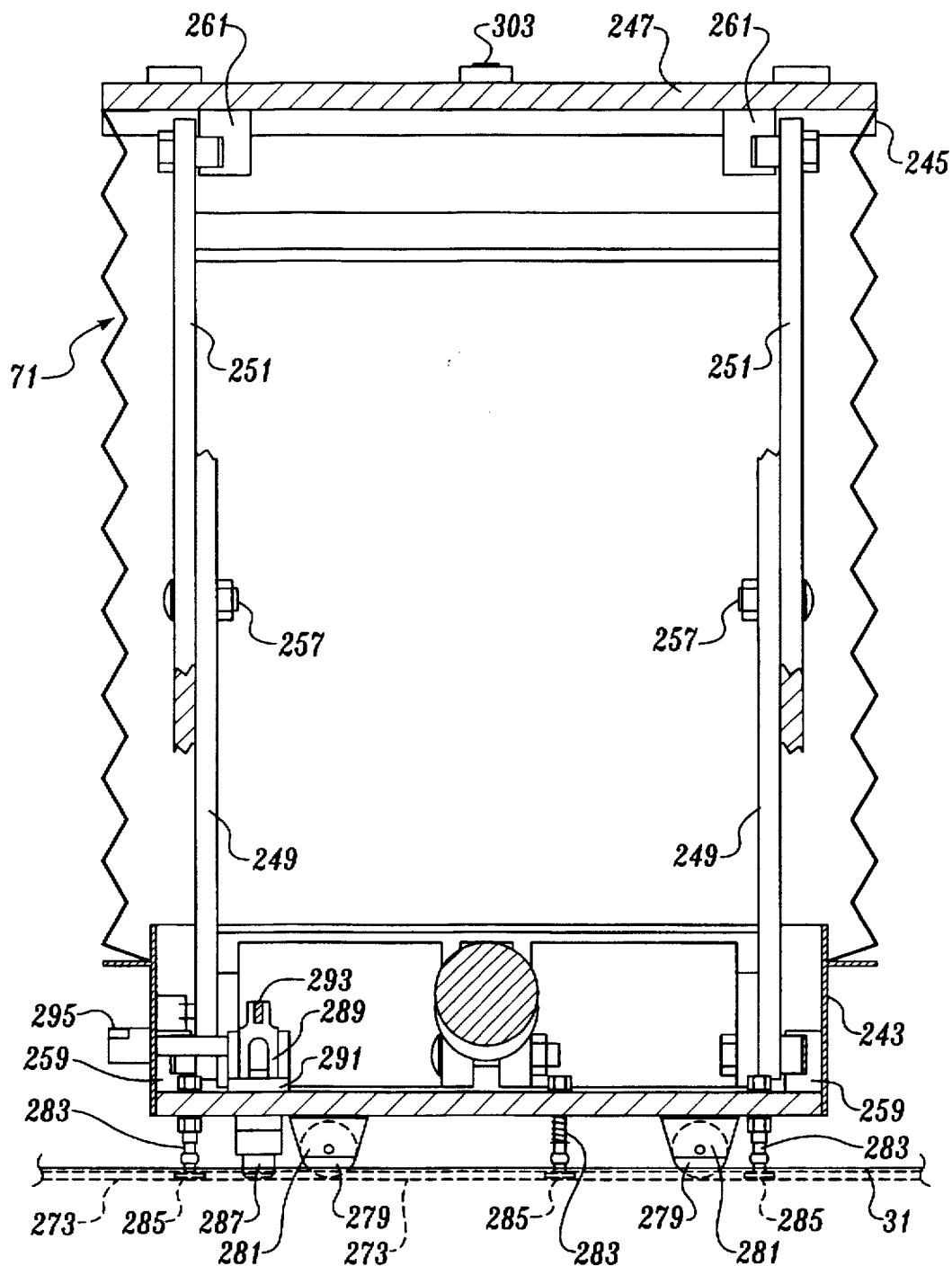
FIG. 29 is a vertical section along line 29—29 of FIG. 28.
Figure 30:
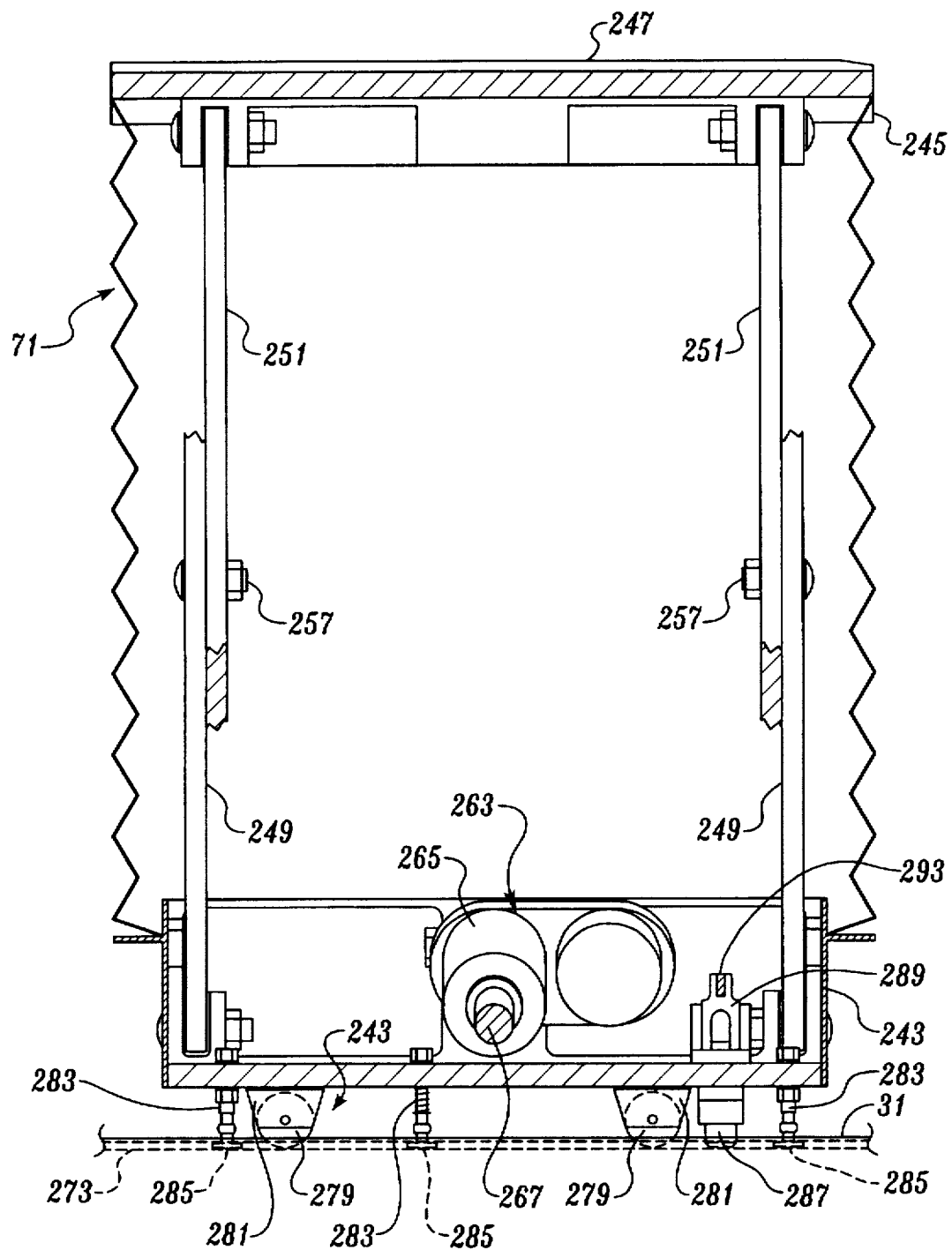
FIG. 30 is a vertical section along line 30—30 of FIG. 28.
Figure 31:
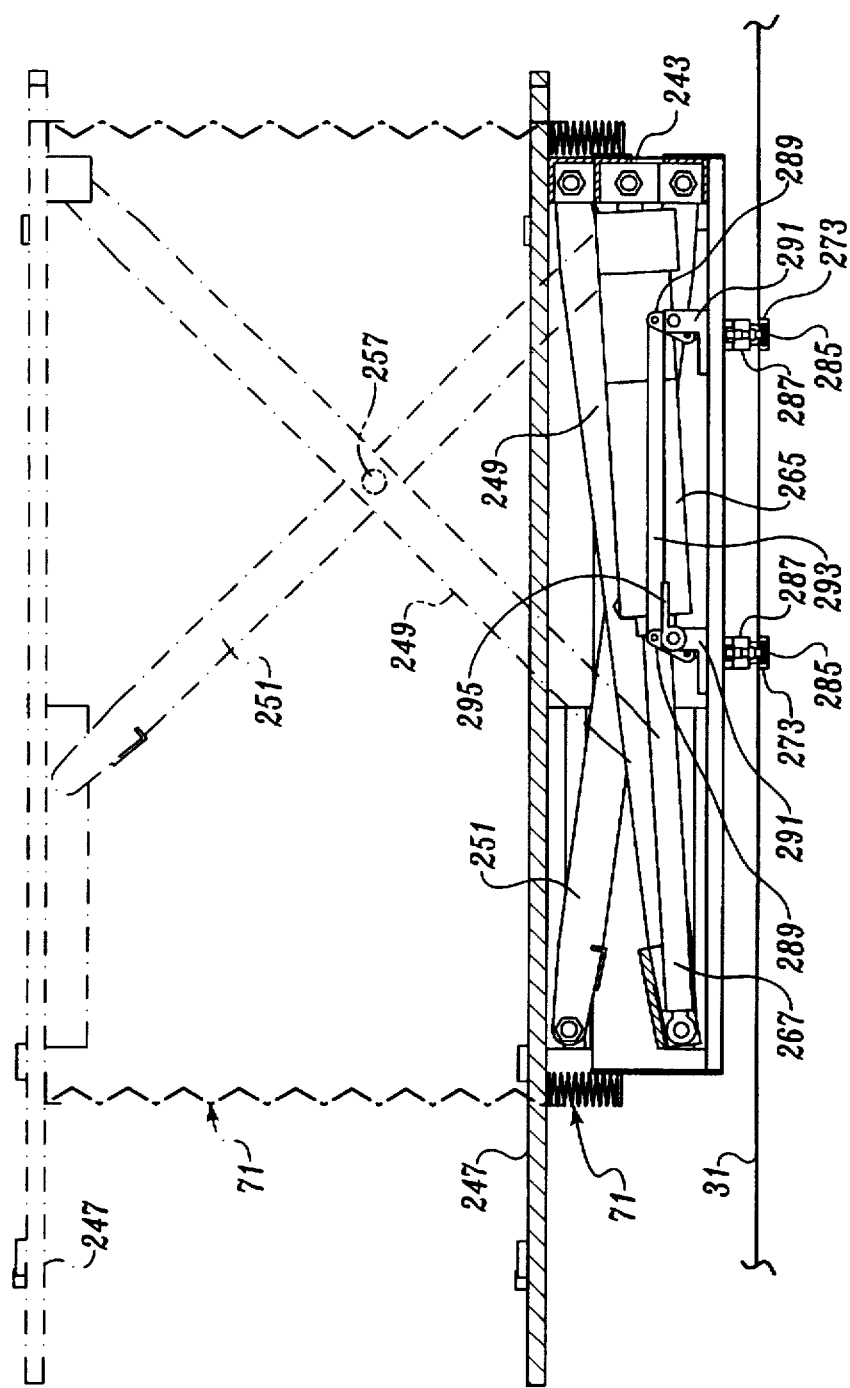
FIG. 31 is a vertical section along line 31—31 of FIG. 28.

With reference to FIG. 29, movement of the carriage and lift assembly 71 in the tracks 273 is guided by legs 283 which depend from the base frame 243 and have enlarged foot pads 285 fitted in the base of the tracks 273. In addition, the carriage and lift assembly 71 can be locked in a desired position by projection of thrust pins 287 into selected circular holes of the two tracks 273. Two such thrust pins 287 are provided, one for each track 273, and each thrust pin 287 is pivotally connected to the end of a generally upright actuating link 289. As seen in FIG. 27, the links 289 are pivoted on brackets 291 mounted on the floor of the base frame 243 and have their upper end portions pivoted to the opposite end portions of a fore-and-aft extending link 293. A control lever 295 is accessible from the exterior of the base frame 243. Such lever 295 controls the position of the rearwardmost link 289 and, through the connecting rod 293, the position of the forward actuating link 289. Turning the lever 295 in one direction swings the links 289 so as to retract the thrust pins 287 and thereby free the carriage and lift assembly 71 for movement transversely of the aircraft 21 along the tracks 273; whereas turning the lever 295 in the other direction has the effect of projecting the thrust pins 287 downward into the circular holes 277 of the tracks 273. The thrust pins 287 are sized to be snugly received within the holes so that, when projected, the carriage and lift assembly 71 is locked in position and cannot be moved until the actuating lever 295 is turned.

Figure 32:
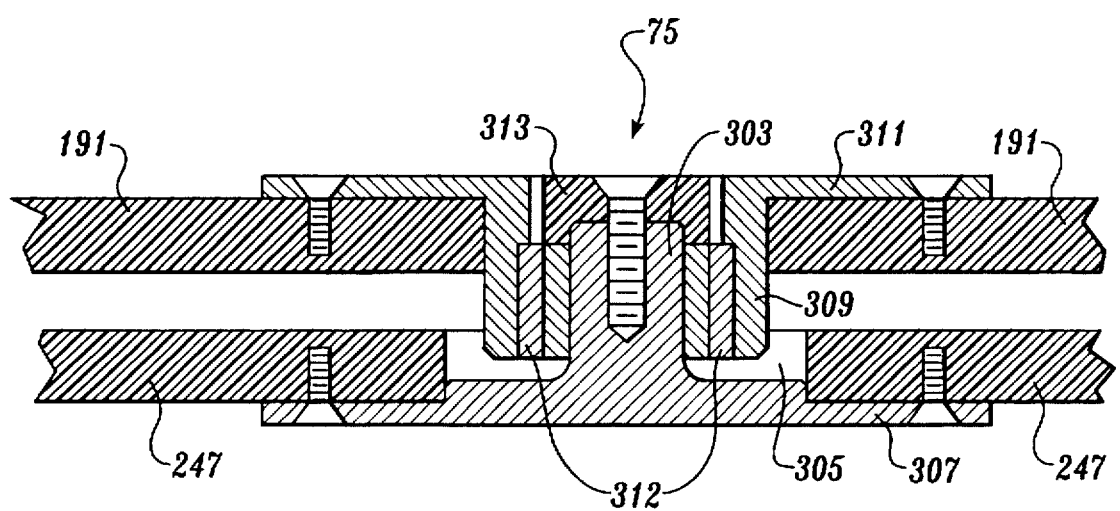
FIG. 32 is an enlarged detailed vertical section through components of the patient transport system in accordance with the present invention, namely, the area of a pivot between the lift assembly and a lower tray.

Again referring to FIG. 27, the top support plate 247 of the carriage and lift assembly 71 includes a rearward extending lip portion 301 having a pivot pin 303, which serves as the axis of rotation for the pivot 75, by means of which the lower tray 67 is connected to the support plate 247. The details of such connection are shown in FIG. 32. The top plate 247 of the carriage and lift assembly 71 has a circular hole 305 through which the pivot pin 303 extends. Such pivot pin 303 is formed integrally with a bottom disc 307 secured to the underside of the support plate 247. Similarly, the panel 191 of the lower tray 67 has an aperture for a socket member 309 formed integrally with a disc 311 secured to the upper side of the panel 191. An antifriction bearing 312 is interposed between the pivot pin 303 and the interior of the socket member 309. A retainer washer 313 can be secured over the top of the pivot pin 303 to prevent separation of the panel 191 from the support plate 247 by blocking retraction of the bearing 312.

Figure 33:
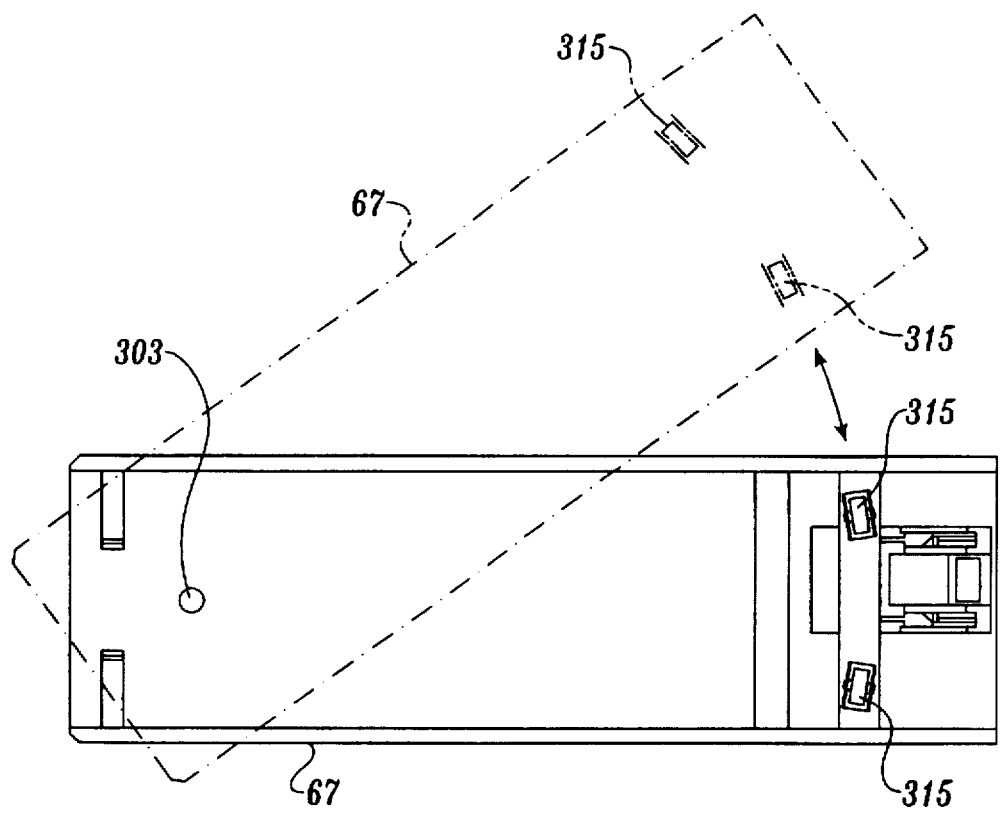
FIG. 33 is a diagrammatic bottom plan of the lower tray.

FIG. 33 (bottom plan) illustrates the swinging motion of the lower tray 67 permitted by the pivot pin 303. When the carriage and lift assembly 71 is collapsed, the head end of the tray 67 is supported on wheels 315. Such wheels 315 preferably are canted relative to each other. Each wheel 315 is mounted to the underside of the tray 67 for rotation about an axis which intersects the axis of the pivot pin 303. Consequently, the lower tray 67 can be swung smoothly about the pivot pin 303.

Figure 34:
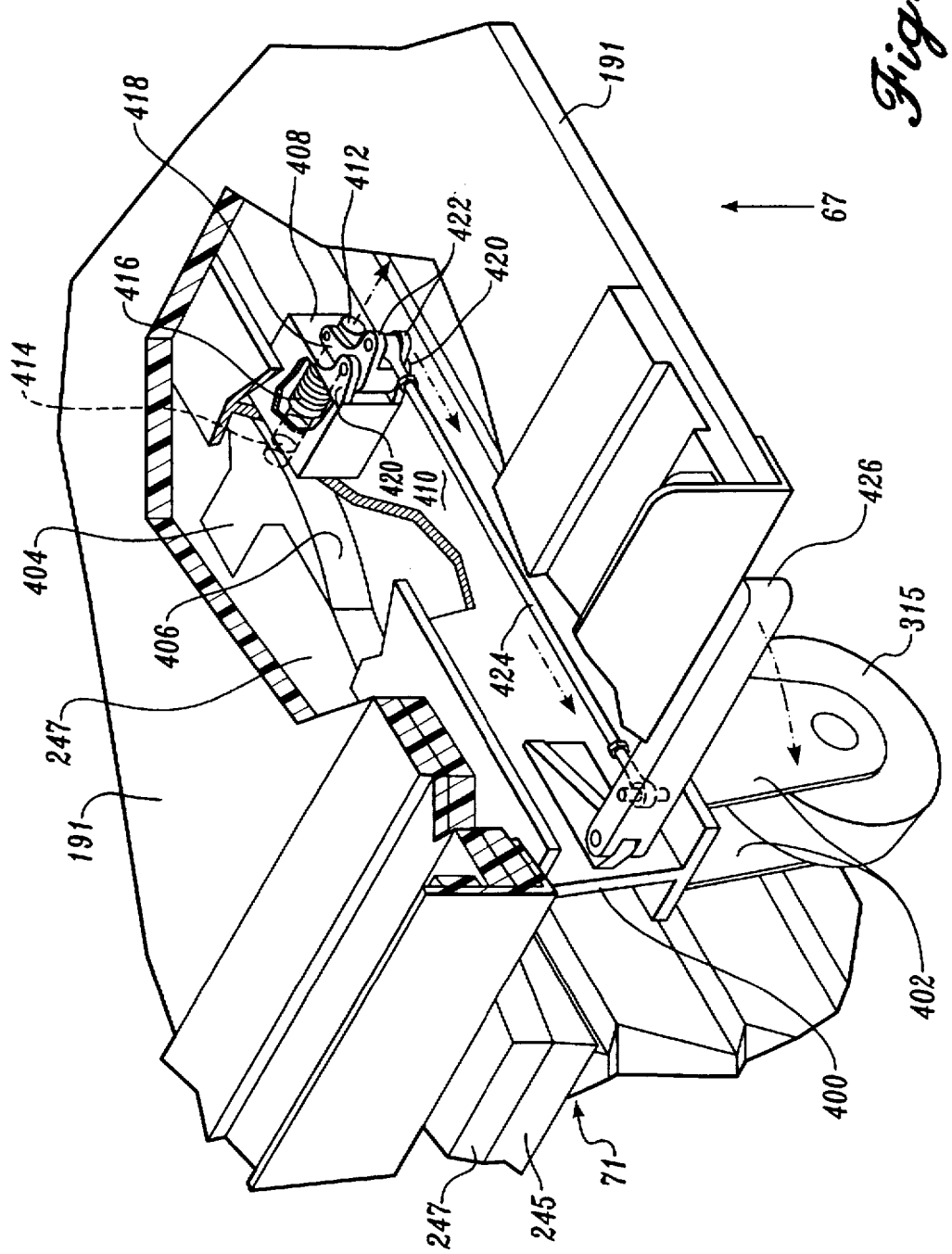
FIG. 34 is an enlarged top right perspective of another component of the preferred patient transport in accordance with the present invention, namely, the assembly for releasably locking the lower tray to the lift assembly.

FIG. 34 illustrates the preferred mechanism for releasably locking the lower tray 67 in position extending longitudinally of the carriage and lift assembly 71. The lower tray 67 includes an I-beam 400 extending transversely below the panel 191 toward the forward or head end portion of the tray 67. The brackets 402 for the canted wheels 315 are secured to the underside of the I-beam 400. The top of the support top plate 247 of the carriage and lift assembly 71 has a cam member 404 that protrudes forward from the head end portion of the support plate 247 at its transverse center. The cam member 404 has a horizontal blind bore that opens through the forward end 406 of the cam member 404.

A releasable locking mechanism includes a rectangular housing 408 mounted on a web 410 of the I-beam 400. The housing 408 encloses a central portion of a locking pin 412 that has a rear end portion 414 for fitting in the blind bore of the cam member 406. The pin 412 is biased to a rearward projected position by a compression spring 416.

The rear portion 414 of the pin 412 protrudes from the rear of housing 408 and is pivotally connected to a transversely extending leg 418 of a bell crank which has its central portion pivoted to mounting lugs or ears 420 projecting rearward from the housing 408. The bell crank includes a forward projecting leg 422 that is pivotally connected to an actuating rod 424. The rod 424 extends transversely beneath the head end portion of the lower tray 67, forward of the I-beam 400, and is pivotally connected to an actuating lever 426. The lever 426 is swingably mounted on the I-beam 400.

In the position illustrated in FIG. 34, the rear portion 414 of the locking pin 412 bridges between the cam member 404 and the I-beam web 410. Consequently, the lower tray 67 is locked in a position extending longitudinally of the carriage and lift assembly 71. When it is desired to swing the head portion of the lower tray 67 outward relative to the carriage and lift assembly 71, the actuating lever 426 can be pulled such that, through the action of the bell crank 418, 422, the locking pin 412 is retracted. When the lower tray 67 is swung back toward the longitudinally extending position, the rear portion 414 of the locking pin 412 will engage the forward surface 406 of the cam member 404 and be wedged progressively inward against the force of the spring 416 until the locking pin 412 snaps into the bore of the cam member 404 and automatically locks the lower tray 67 in position.

The close fit of the upper tray 61 over the lower tray 67 provides an important safety feature. When a litter L1 is first loaded onto the upper tray 61 and locked in position, the upper tray 61 is in its extended position, telescoped outward from the lower tray 67, as illustrated diagrammatically in FIG. 2. Thereafter the upper tray 61 is moved into a position registered over the lower tray 67. In such position, the close fit of the upper tray 61 over the lower tray 67 prevents the handle 51 of the axle lock assembly 145 mechanism from inadvertently being moved to the released position. Similarly, when the upper tray 61 is shifted onto the bedplate assembly 63, 64, preferably the handle 51 of the axle lock assembly 145 will fit over the front bedplate 63, so that the litter L1 cannot be released without shifting the upper tray 61 forward, which would required that it be unlocked from the bedplate assembly 63, 64. Further, the handle 51 for the axle lock assembly 145 of the lower tray 67 fits closely over the support plate 247 of the carriage and lift assembly 71, which prevents inadvertent release of the second patient litter from the lower tray 67 when the lower tray 67 is in its longitudinally extending position. It is preferred that it be necessary to swing the lower tray 67 relative to the carriage and lift assembly 71 in order to release the axle lock assembly 145.

While preferred embodiments of the invention have been illustrated and described, it will be appreciated that various changes can be made thereto without departing from the spirit and scope of the invention.

The embodiments of the invention in which an exclusive property or privilege is claimed are defined as follows:

I claim:

1. An apparatus for positioning and securing a patient support relative to an interior of a vehicle having a floor, said apparatus comprising:

a first tray for removably receiving the patient support wherein the patient support can be secured to said first tray for transportation of a patient; and a first base on the floor of the vehicle, said first tray being removably, telescopically connected to said first base such that said first tray can be telescopically, longitudinally extended relative to said first base, said first tray being pivotally attached to said first base for pivotal movement of said first tray about an axis generally perpendicular to the floor, said first base including means for moving the first tray towards, and away from, the floor.

2. The apparatus of claim 1, wherein said first base includes a second tray in which said first tray detachably mounts such that said first tray and said second tray are removably, telescopically connected whereby said first tray can be telescopically, longitudinally extended relative to said second tray.

3. The apparatus of claim 2 wherein said second tray is pivotally connected to said base to provide said pivotal movement of said first tray.

4. The apparatus of claim 1 wherein said first base is secured to the floor of the vehicle.

5. The apparatus of claim 1 wherein said first base is movably secured to the floor of the vehicle.

6. An apparatus for positioning and securing a first patient support and a second patient support relative to an interior of a vehicle having a floor, said apparatus comprising:

a first tray for removably receiving the first patient support;

a second tray for removably receiving the second patient support. said first tray and said second tray being removably telescopically connected such that said first tray can be oriented on said second tray and can be telescopically, longitudinally extended relative to said second tray; and a first base on the floor of the vehicle adapted to support said second tray. said second tray being pivotally attached to said first base for pivotal movement of said first tray and said second tray, said first base including means for moving said first tray and said second tray towards. and away from. the floor wherein upon telescopic, longitudinal extension of said first tray to said second tray, said first tray is removable from said second tray and is securable in said vehicle at a location remote from said second tray for sequential loading of the first patient support onto said first tray followed by loading of the second patient support onto said second tray.

7. The apparatus of claim 6 wherein said first base is secured to the floor of the vehicle.

8. The apparatus of claim 6 wherein said first base is movably secured to the floor of the vehicle.

9. The apparatus of claim 6 further comprising a second base on which said first tray is securable in said vehicle at said location remote from said second tray.

10. The apparatus of claim 9 wherein said first base and said second base each have a longitudinal axis. said longitudinal axes of said first base and said second base being substantially parallel.

11. The apparatus of claim 10 wherein said longitudinal axes of said first base and said second base are substantially coaxial when said means for moving said first tray has moved said first tray a predetermined distance relative to the floor such that said first tray can be transferred from said first base to said second base.

12. The apparatus of claim 9 wherein said first base is secured to the floor of the vehicle.

13. The apparatus of claim 9 wherein said first base is movably secured to the floor of the vehicle.

14. An apparatus for positioning and securing a first patient support and a second patient support relative to an interior of a vehicle having a floor. said apparatus comprising:

a first tray for removably receiving the first patient support;

a second tray for removably receiving the second patient support. said first tray and said second tray being removably telescopically connected such that said first tray can be oriented on said second tray and can be telescopically, longtudinally extended relative to said second tray;

a first base on the floor of the vehicle adapted to support said second tray. said second tray being pivotally attached to said first base for pivotal movement of said first and said second tray, said first base including electric jack means for moving the first tray and the second tray towards. and away from. the floor; and a second base on which said first tray is securable in said vehicle at a location remote from said second tray.

* * * * *